(12) United States Patent
Klein et al.

(10) Patent No.: US 10,986,791 B2
(45) Date of Patent: Apr. 27, 2021

(54) HYDROPONIC TOWER COMPATIBLE PLANT PLUG HOLDER

(71) Applicant: MJNN, LLC, South San Francisco, CA (US)

(72) Inventors: Brice Klein, San Francisco, CA (US); Alex Ibrahim, Pacifica, CA (US); Matthew Matera, San Francisco, CA (US)

(73) Assignee: MJNN LLC, South San Francisco, CA (US)

( * ) Notice: Subject to any disclaimer, the term of this patent is extended or adjusted under 35 U.S.C. 154(b) by 179 days.

(21) Appl. No.: 15/910,796

(22) Filed: Mar. 2, 2018

(65) Prior Publication Data

US 2019/0269083 A1  Sep. 5, 2019

(51) Int. Cl.
*A01G 31/06* (2006.01)
*A01G 9/029* (2018.01)
*A01G 24/40* (2018.01)

(52) U.S. Cl.
CPC .......... *A01G 31/06* (2013.01); *A01G 9/0293* (2018.02); *A01G 24/40* (2018.02)

(58) Field of Classification Search
CPC ......... A01G 9/047; A01G 31/04; A01G 31/06
See application file for complete search history.

(56) References Cited

U.S. PATENT DOCUMENTS

| | | | | |
|---|---|---|---|---|
| 3,896,587 A * | 7/1975 | Insalaco | .................. | A01G 9/021 47/65.5 |
| 4,033,072 A * | 7/1977 | Kobayashi | ............. | A01G 31/06 47/62 R |
| 5,251,399 A * | 10/1993 | Rasmussen | ............ | A01G 9/023 211/88.03 |
| 5,502,923 A * | 4/1996 | Bradshaw | ............... | A01G 31/06 47/62 A |
| 5,555,676 A * | 9/1996 | Lund | ...................... | A01G 9/022 47/82 |
| 5,913,477 A * | 6/1999 | Dean | ........................ | A01G 9/12 239/289 |
| 5,918,416 A * | 7/1999 | Ammann, Jr. | ......... | A01G 31/02 47/58.1 R |
| 6,477,805 B2 * | 11/2002 | Ware | ...................... | A01G 31/02 47/83 |
| 7,171,782 B2 * | 2/2007 | Felknor | ................ | A01G 9/0291 47/73 |
| 10,499,575 B2 * | 12/2019 | Stoltzfus | ................ | A01G 31/06 |
| 2003/0089037 A1 * | 5/2003 | Ware | ...................... | A01G 31/02 47/83 |

(Continued)

*Primary Examiner* — Magdalena Topolski
*Assistant Examiner* — Morgan T Barlow
(74) *Attorney, Agent, or Firm* — Almanac IP Advisors LLP

(57) ABSTRACT

A hydroponic tower including a cavity defining a front tower surface and a rear inside surface, and further including a plant plug holder inserted within a cut-out defined in the front tower surface. The plant plug holder includes an edge member that encircles the cut-out, and a base member that supports a plant plug and extends rearward from the edge member and into the cavity of the tower. The plug holder further includes a rear shroud top member and a pair of side members that maintain the position of the plant plug within the plug holder such that the plant plug contacts the rear inside surface of the cavity when inserted into the plug holder.

29 Claims, 20 Drawing Sheets

(56) References Cited

U.S. PATENT DOCUMENTS

| | | | | |
|---|---|---|---|---|
| 2008/0078118 | A1* | 4/2008 | Bissonnette | A01G 9/02 47/63 |
| 2012/0279126 | A1* | 11/2012 | Simmons | A01G 31/02 47/62 A |
| 2014/0290137 | A1* | 10/2014 | Nagels | A01G 31/06 47/62 R |
| 2015/0173314 | A1* | 6/2015 | Buonaiuto, Jr. | A01G 31/02 47/62 R |
| 2015/0313104 | A1* | 11/2015 | Cottrell | A01G 22/00 47/62 A |
| 2016/0050863 | A1* | 2/2016 | Graber | A01G 31/02 47/62 R |
| 2016/0066525 | A1* | 3/2016 | Duquesnay | A01G 9/025 47/62 R |
| 2016/0120141 | A1* | 5/2016 | Stolzfus | A01G 31/06 47/62 A |
| 2016/0135398 | A1* | 5/2016 | Mathieu | A01G 31/06 47/62 R |
| 2016/0143234 | A1* | 5/2016 | Nasu | A01G 9/024 47/62 N |
| 2017/0055473 | A1* | 3/2017 | Baker | A01G 31/06 |
| 2017/0094896 | A1* | 4/2017 | Van Der Knaap | A01G 9/0299 |
| 2017/0105372 | A1* | 4/2017 | Bryan, III | A01G 31/02 |
| 2017/0202164 | A1* | 7/2017 | Dufresne | A01G 31/06 |
| 2017/0238486 | A1* | 8/2017 | De Feo | A01G 9/021 |
| 2017/0339841 | A1* | 11/2017 | Monasterio | A01G 9/0293 |
| 2018/0007849 | A1* | 1/2018 | Cohen | A01G 31/02 |
| 2018/0042186 | A1* | 2/2018 | Kop | A01H 1/025 |
| 2018/0042191 | A1* | 2/2018 | Blackburn | A01G 9/029 |
| 2018/0084744 | A1* | 3/2018 | Tidona | A01G 9/023 |
| 2018/0092314 | A1* | 4/2018 | McGuinness | A01G 9/023 |
| 2018/0125015 | A1* | 5/2018 | Marshall | A01G 27/04 |
| 2018/0213734 | A1* | 8/2018 | Smith | A01G 24/00 |
| 2018/0295800 | A1* | 10/2018 | Kiernan | A01G 31/06 |
| 2018/0325038 | A1* | 11/2018 | Spiro | A01G 31/06 |
| 2018/0325052 | A1* | 11/2018 | Gru | A01G 31/02 |
| 2018/0368346 | A1* | 12/2018 | Watson | A01G 31/06 |
| 2019/0082617 | A1* | 3/2019 | Moffitt | A01G 22/00 |
| 2019/0082627 | A1* | 3/2019 | Moffitt | A01G 31/06 |
| 2019/0166778 | A1* | 6/2019 | Hendrick | A01G 31/06 |
| 2019/0200551 | A1* | 7/2019 | Walters | A01G 31/02 |
| 2019/0269080 | A1* | 9/2019 | Whitworth | A01G 27/06 |
| 2019/0269081 | A1* | 9/2019 | Whitworth | A01G 31/06 |
| 2020/0008366 | A1* | 1/2020 | Klein | A01G 9/025 |
| 2020/0008378 | A1* | 1/2020 | Van Buuren | A01G 31/06 |

* cited by examiner

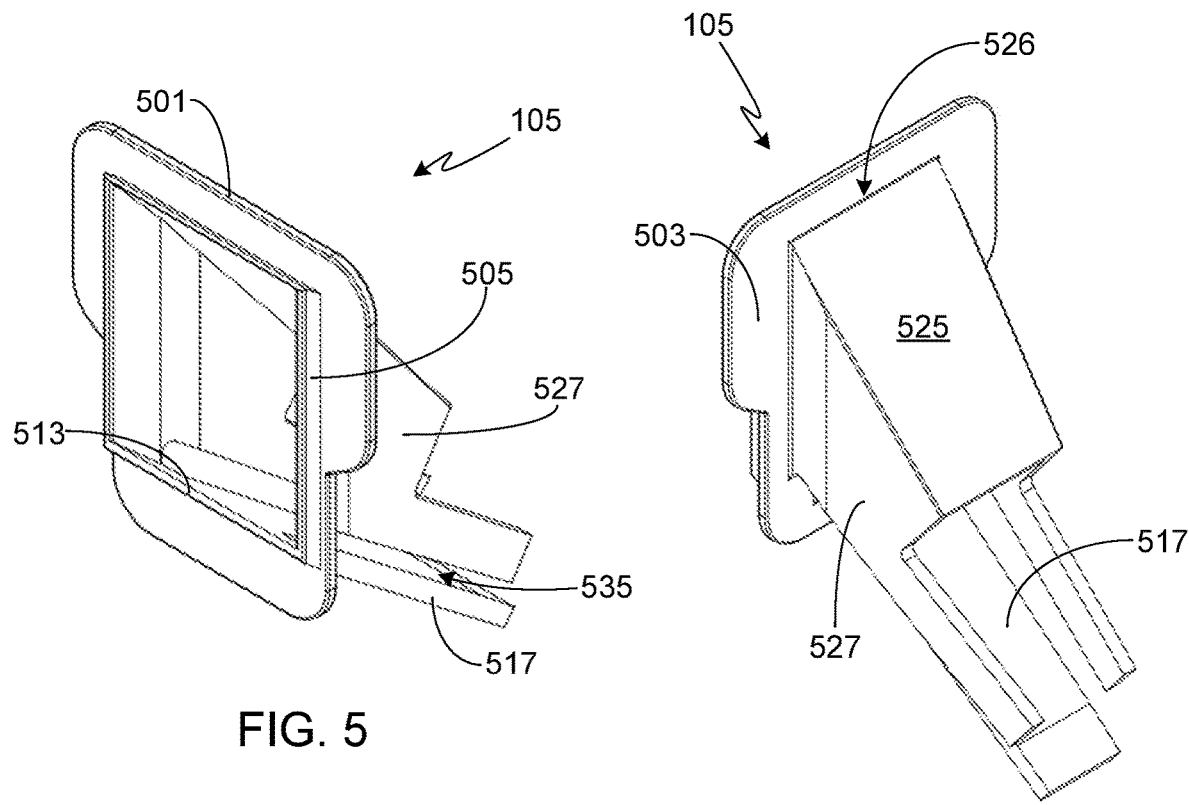
FIG. 5
FIG. 6
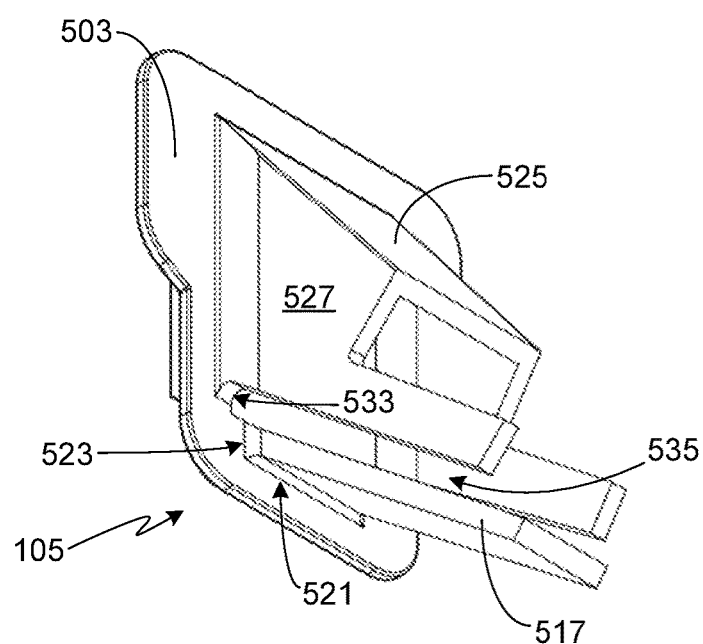
FIG. 7

HYDROPONIC TOWER COMPATIBLE PLANT PLUG HOLDER

FIELD OF THE INVENTION

The present invention relates generally to hydroponic growing systems and, more particularly, to a plant plug holder configured to hold a seedling within a hydroponic tower while it grows from seedling to mature plant.

BACKGROUND OF THE INVENTION

Given the continued growth of the world's population, and given that the regions allocated for agricultural pursuits have decreased or simply become less favorable to such activities, the ability of conventional farms to feed the world's growing population has become increasingly taxed. Additionally, since population centers and agricultural centers are frequently not co-located, and due to the time and expense associated with shipping agricultural goods, in many regions of the world only the wealthy are able to obtain adequate supplies of non-processed food, i.e., raw fruits and vegetables. Furthermore, the fruits and vegetables that do reach population centers are likely to be of decreased nutritional content and flavor, both due to the distance that they have traveled and the fact that much of today's produce is bred for durability and fertility rather than flavor & nutrition. As a result, there has been a renewed interest in soilless growing techniques that do not require the use of pesticides, drastically reduce the use of water, and allow for growing varietals that are bred for nutrition and flavor instead of durability.

Hydroponics is a soilless growing technique in which plants are grown using a liquid solution of water and nutrients. The roots of the plants are typically maintained in a fibrous or granular material, often comprised of plastic, and fed via a wick, drip, nutrient film, or other nutrient delivery system. Hydroponic growing systems are often established within indoor facilities, thus allowing them to be located in or near population centers. This approach also provides exceptional climate control (i.e., temperature, humidity, air flow, $CO_2$ concentration, light wavelength, intensity and duration, etc.) as well as improved pest and disease control, thus allowing an indoor hydroponic farm to succeed in a region in which the outside environment and/or the soil conditions are inhospitable to the use of conventional farming techniques. Furthermore, hydroponic and other soilless growing techniques can yield extremely high plant densities, especially in those instances in which either horizontal stacking systems or vertical growth towers are used.

While hydroponic farming techniques offer a number of advantages over conventional farming techniques, in order to achieve large-scale adoption of these techniques it is vital that the cost per plant be competitive with the costs associated with conventional farming techniques. Accordingly, the present invention provides a plant plug holder that achieves increased planting consistency and simplified tower maintenance while minimizing tower leakage.

SUMMARY OF THE INVENTION

The present invention provides a plant plug holder configured to be inserted within a cut-out in a hydroponic tower, where the plant plug holder is comprised of (i) an edge member, (ii) a base member that extends rearward from the back surface of the edge member, and (iii) a rear shroud that extends rearward from the back surface of the edge member. The edge member, which encircles the opening of the plant plug holder, includes a back surface that is proximate to the front tower surface when the plant plug holder is fully inserted into the tower. The rear shroud includes (i) a top member, where the junction between the top member and the back surface of the edge member is continuous; (ii) a first side member, where the junction between the first side member and the back surface of the edge member is continuous; and (iii) a second side member, where the junction between the second side member and the back surface of the edge member is continuous. The plant plug holder also includes first and second open regions configured to promote water drainage from the top surface of the base member, where the first open region is located between the base member and the first side member and the second open region is located between the base member and the second side member. The first and second open regions are directly adjacent to the top surface of the base member. The first and second open regions may be configured as continuous open slots extending rearward from the back surface of the edge member.

In one aspect of the plant plug holder, a seal may be formed between the back surface of the edge member and the front tower surface, where the seal circumscribes the plant plug holder opening. The seal may be formed by bonding, ultrasonic welding, or other means.

In another aspect, the plant plug holder may include a front shroud that extends out and away from a front surface of the edge member, where the front shroud encircles the plant plug holder opening. The front lip of the front shroud is preferably parallel with the front tower surface when the plant plug holder is fully inserted into the tower. The upper face of the lower lip of the front shroud is preferably collinear with the top surface of the base member.

In another aspect, when the plant plug is fully inserted into the plant plug holder the base member may be either (i) horizontally positioned or (ii) angled downwards. When angled downwards, the angle is preferably in the range of 10 to 60 degrees, and more preferably in the range of 40 to 50 degrees.

In another aspect, the rearmost edge of the base member is preferably located within 2.54 millimeters (0.1 inches) of the inside rear surface of the hydroponic tower when the plant plug holder is fully inserted into the hydroponic tower.

In another aspect, when the plant plug is fully inserted into the plant plug holder the top member of the rear shroud may cover (i) a third or less of the plant plug's top surface or (ii) at least a third of the plant plug's surface. The top member may be planar or comprised of multiple, non-planar portions.

In another aspect, the first and second side members may each include at least one aperture (e.g., an open-ended slot). The base member may include at least one aperture (e.g., an open-ended slot).

In another aspect, preferably a first portion of each of the side members only extends rearward into the tower's central cavity to the same extent as the top member while a second portion of each of the side members extends rearward into the tower's central cavity to a greater extent than the top member. The rearmost edge of each of the side members may be located within 2.54 millimeters (0.1 inches) of the inside rear surface of the hydroponic tower when the plant plug holder is fully inserted into the hydroponic tower.

In another aspect, the first and second side members may be tapered inwards. Additionally, the base member and the top member may be tapered inwards. The taper angle of each of these members (i.e., first and second side members, base member, top member) may be the same as, or greater than, the corresponding taper angle of the plant plug inserted into the plant plug holder.

The plant plug holder, which may be fabricated as a single unit, is preferably fabricated from a plastic material (e.g., polyethylene, polypropylene, polyvinyl chloride, polytetrafluoroethylene, and acrylonitrile butadiene styrene), and preferably fabricated from a plastic material that is white.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

FIG. 5 provides a first perspective view of a preferred embodiment of a plant plug holder in accordance with the invention;

FIG. 6 provides a second perspective view of the preferred embodiment of the plant plug holder shown in FIG. 5;

FIG. 7 provides a third perspective view of the preferred embodiment of the plant plug holder shown in FIGS. 5 and 6;

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

Figure 1:
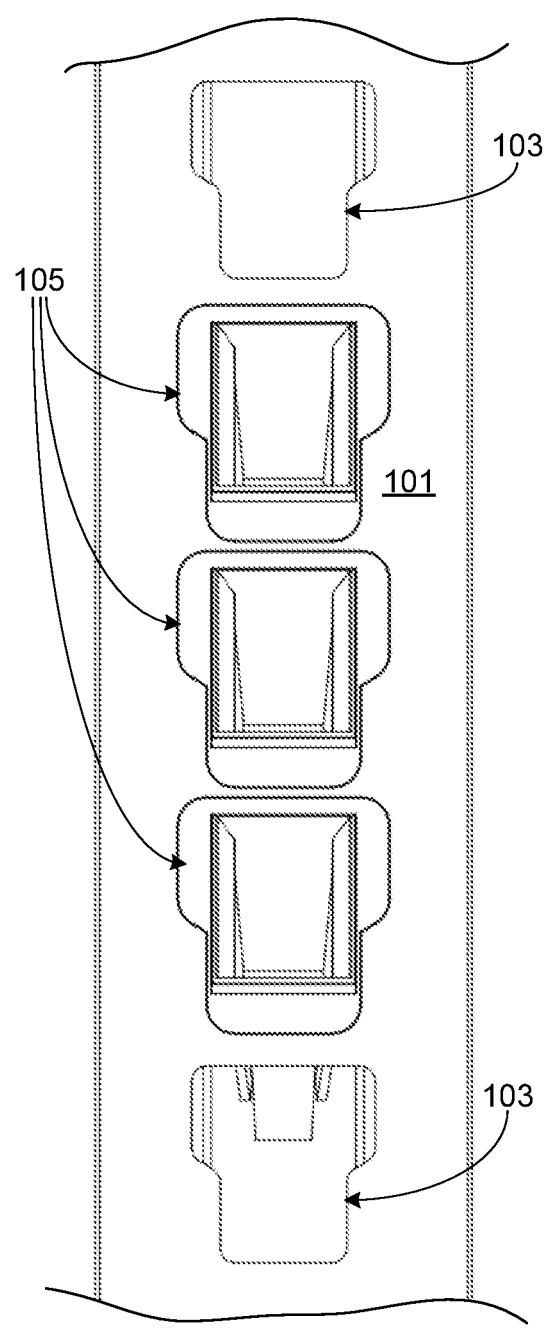
FIG. 1 provides a front planar view of a portion of hydroponic tower containing several of the plant plug holders of the present invention.

FIG. 1 provides a front planar view of a portion of a hydroponic tower assembly. In this view, a portion of the tower face 101 is visible as well as a plurality of cut-outs 103. Each cut-out 103 is sized to accommodate a plant plug holder 105. Note that in this view, plant plug holders 105 are only inserted within the three middle cut-outs 103. In this illustration, uppermost and lowermost cut-outs 103 are open.

Figure 2:
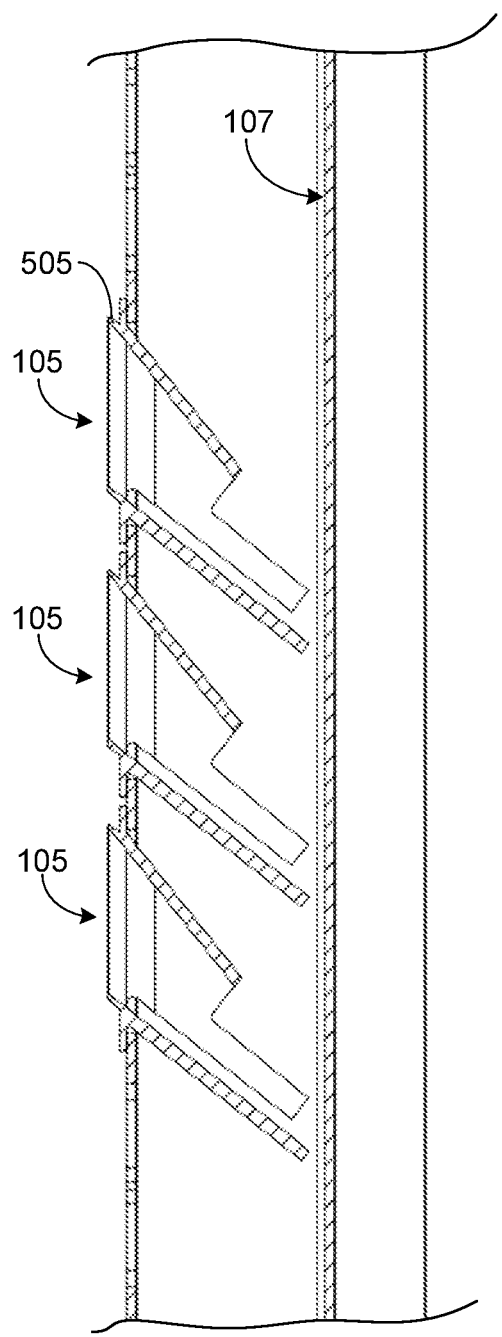
FIG. 2 provides a side cross-sectional view of the tower assembly shown in FIG. 1.
Figure 3:
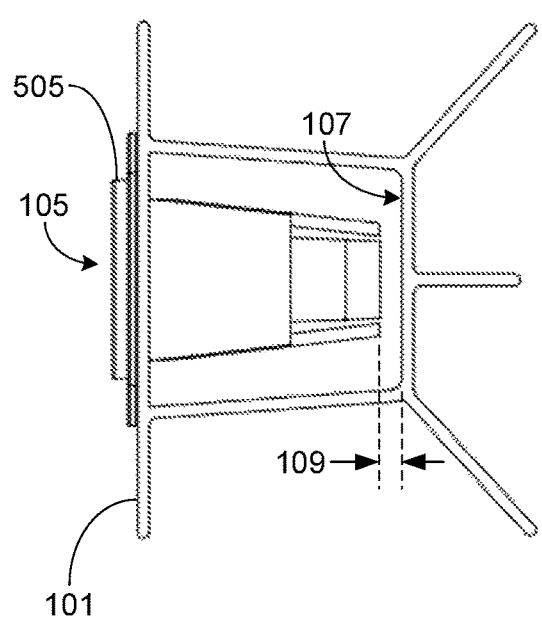
FIG. 3 provides an alternate cross-sectional view of the tower assembly shown in FIGS. 1 and 2.
Figure 4:
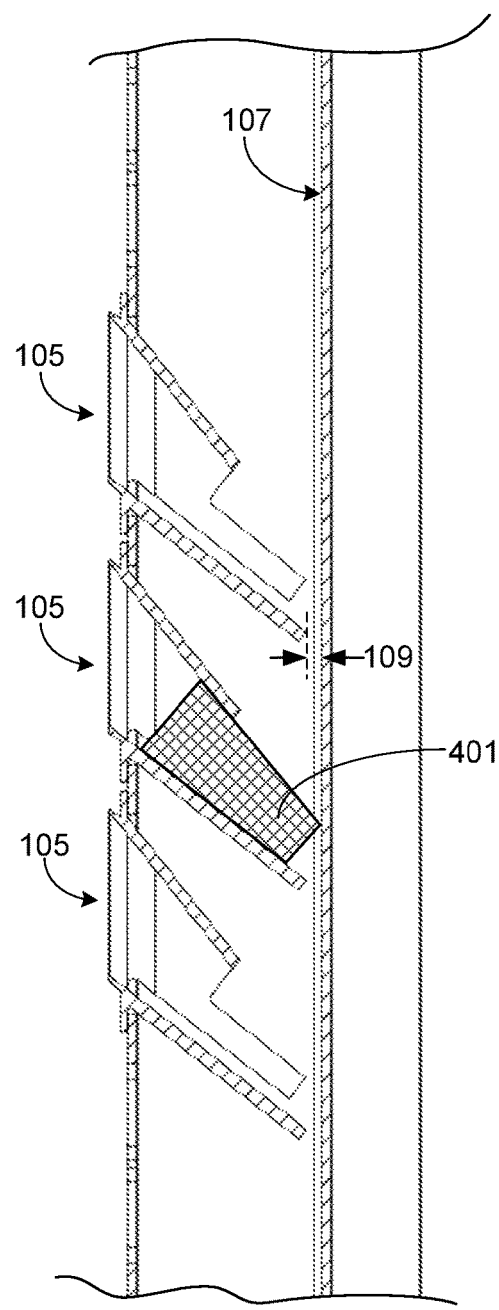
FIG. 4 provides the same view as that shown in FIG. 2, with the inclusion of a plant plug within one of the plant plug holders.
Figure 8:
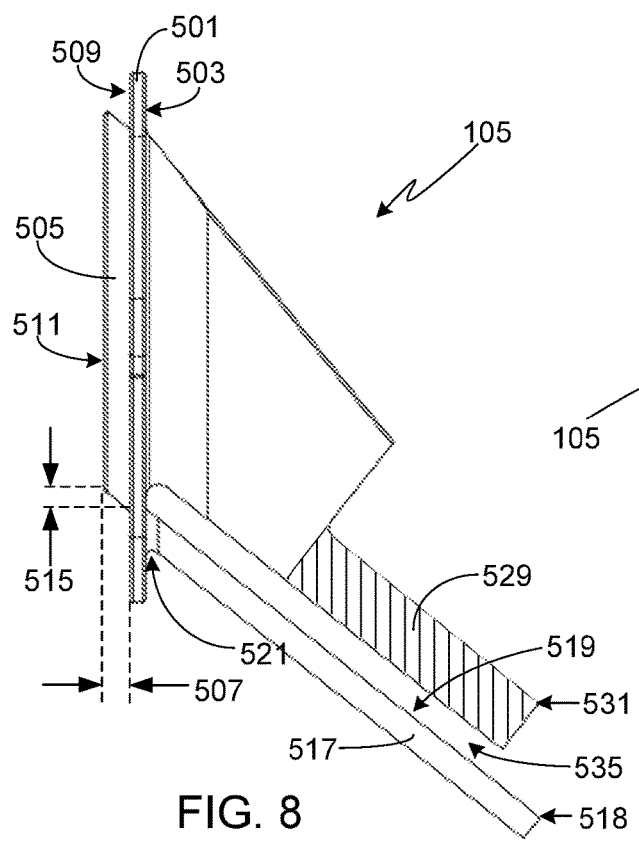
FIG. 8 provides a side view of the plant plug holder shown in FIGS. 5-7.
Figure 9:
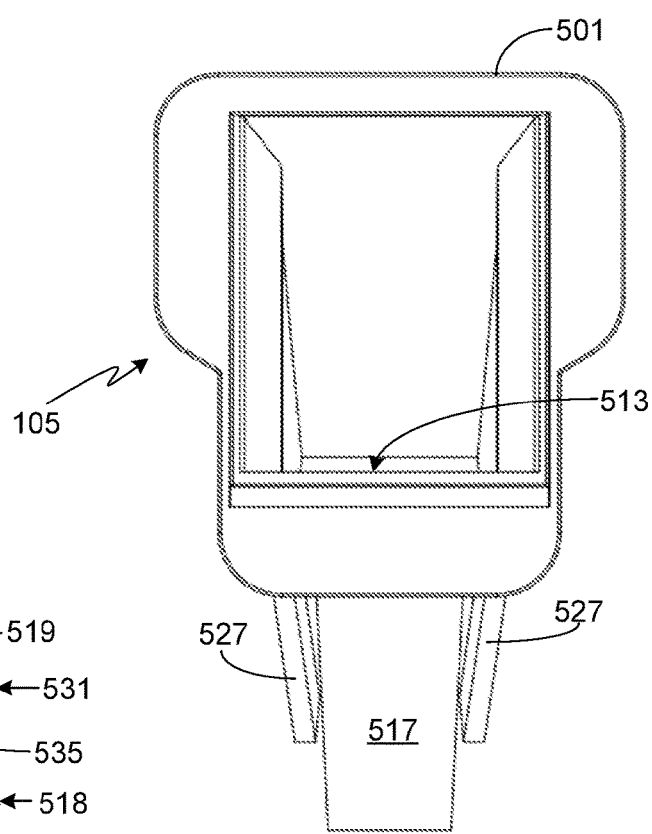
FIG. 9 provides a front view of the plant plug holder shown in FIGS. 5-8.

FIGS. 2 and 3 provide vertical and horizontal cross-sectional views, respectively, of the portion of the tower assembly shown in FIG. 1. FIG. 4 provides the same cross-sectional view as that shown in FIG. 2, with the addition of a plant plug 401 within the middle holder 105. Note that in FIG. 4, only the plant plug is shown, i.e., there is no seedling or mature plant contained within plug 401.

The plant plug holder of the invention is not limited to use with a particular hydroponic tower design. For example, the tower can be extruded as a single piece tower. Alternately, the tower can utilize a multi-piece design, such as that disclosed in co-assigned and co-pending U.S. patent application Ser. No. 15/910,601, filed 2 Mar. 2018, the disclosure of which is incorporated herein by reference for any and all purposes. Cut-outs 103 can be punched out, machined (e.g., utilizing a computer numerical control (CNC) machine), or otherwise fabricated into the tower face. Although any of a variety of materials can be used in the manufacture of the tower, preferably the tower is fabricated from plastic (e.g., polyethylene, polypropylene, polyvinyl chloride, polytetrafluoroethylene, acrylonitrile butadiene styrene, etc.), and more preferably from an opaque polyvinyl chloride (PVC) plastic that is colored white. Using an opaque PVC material that prevents light from entering the tower helps to minimize algae blooms while the white coloring increases the amount of light reflected back onto the plants.

Plant plug holder 105 is preferably fabricated from plastic (e.g., polyethylene, polypropylene, polyvinyl chloride, polytetrafluoroethylene, acrylonitrile butadiene styrene, etc.). In the preferred embodiment, plug holder 105 is fabricated using injection molding, although it should be understood that other manufacturing techniques may be used to fabricate the plant plug holder. As with the tower, preferably plant plug holder 105 is manufactured using an opaque plastic (e.g., PVC) that is colored white to minimize algae blooms within the tower and increase reflected light.

Plant plug holder 105 is attached to tower face 101 via edge member 501, where edge member 501 encircles the plant container opening as shown. Edge member 501 extends out and away from the sides of the plug holder, thereby allowing the back surface 503 of edge member 501 to be sealed to the tower face. While the plug holder does not have to be sealed to the tower face, sealing is preferred in order to inhibit leaking between the two parts. Preferably the seal, which is formed between back surface 503 and tower face 101, completely circumscribes the plant container opening. Although a variety of techniques can be used to seal the two components together, preferably they are either bonded together (e.g., solvent bonding) or welded together (e.g., ultrasonic welding).

In the preferred embodiment, a front shroud 505 extends out and away from edge member 501, thereby further inhibiting water from leaking out the front of the plant plug holder. In this embodiment, the shroud opening is 31.75 millimeters by 31.75 millimeters (1.25 inches by 1.25 inches), although it will be appreciated that other sizes can be used, depending primarily upon the dimensions of the intended plug. In the illustrated embodiment, the distance 507 between the front face 509 of edge member 501 and the front lip 511 of the shroud is 2.54 millimeters (0.10 inches). Given the wall thickness of the shroud as well as the angle of the plug holder, the bottom edge 513 of the front shroud lip 511 is higher than the plug holder opening, also helping to inhibit water leakage. In the illustrated embodiment, distance 515 measured between the bottom edge 513 and the base of the plug holder opening is approximately 2.03 millimeters (0.08 inches). It should be understood, however, that while the dimensions provided above are preferred, other shroud configurations may be used. For example, distance 507 may be larger or smaller than 2.54 millimeters (0.10 inches). Additionally, although not preferred, the holder may be configured without a front shroud.

In the preferred embodiment, the shroud lip 511 is parallel with the face of the tower as shown. The inventors have found that this configuration for the face of the shroud, along with the use of a flat lip rather than jagged or otherwise non-flat lip, simplifies plant harvesting.

Plant plug holder 105 includes a base member 517 that extends rearward from the back surface 503 of edge member 501. As base member 517 supports the plant plug and prevents it from sagging as it becomes saturated with water, preferably the base member extends into the tower such that it almost touches the rear tower surface 107. Preferably the separation distance 109 between the rearmost edge 518 of base member 517 and the rear tower surface 107 is less than 2.54 millimeters (0.1 inches), and more preferably set at approximately 1.78 millimeters (0.07 inches). While it would not be detrimental to have the rearmost edge of the base member touch the rear tower surface, due to manufacturing tolerances, a small gap is preferred to insure that surface 503 of the plant plug holder can fit snugly against, and be sealed to, the tower face 101.

When the plant plug holder is completely inserted into cut-out 103 such that back surface 503 of edge member 501 is flat against front tower surface 101, base member 517 of plant plug holder 105 is angled downwards as measured from the front to the rear of the member (see figures). While the plant plug holder of the invention may be used with a horizontally positioned base member and such a configuration does have advantages (e.g., simplifying the transplanting process), in such a configuration it is often difficult to prevent water from leaking out of the front of the plug holder. Accordingly, in the preferred embodiment the angle of base member 517 is in the range of 10 to 60 degrees off horizontal, and more preferably in the range of 40 to 50 degrees off horizontal.

Although there is preferably a slight separation between the rearmost edge 518 of base member 517 and the rear tower surface 107 as noted above, the plug holder is designed to insure that the rear surface of the plant plug 401 rests against the rear tower surface 107 as shown in FIG. 4. In the preferred embodiment, water and nutrients are directed towards the tower's rear inner surface 107 where they can then flow downward, feeding the plants 401 contained in the individual plant plug holders 105. In order to help control water/nutrient flow along the back wall of the tower cavity to the plant plugs, preferably a series of vertical ridges are fabricated onto surface 107 as disclosed in co-assigned and co-pending U.S. patent application Ser. No. 15/910,601, filed 2 Mar. 2018, the disclosure of which is incorporated herein for any and all purposes.

The top surface 519 of the base member and the upper face of the lower lip of the shroud are preferably collinear, thus insuring that the plant plug can be easily inserted into the plug holder. In the preferred embodiment, base member 517 is tapered with the widest portion of the member being located at the front of the plug holder, and the narrowest portion of the member being located at the rear of the plug holder (i.e., proximate to rear tower surface 107). Since plant plugs are typically tapered, tapering the base member prevents it from unnecessarily blocking the inside of the tower. To reduce stress concentrations and improve the fatigue life of base member 517, preferably there is a fillet 521 between the bottom of base member 517 and surface 503 of the plug holder's edge member 501, and a fillet 523 between the side of base member 517 and surface 503 of the plug holder's edge member 501.

As shown in FIGS. 5-10, plug holder 105 includes a rear shroud that extends from back surface 503 of edge member 501. The rear shroud includes a solid top member 525 which is joined to back surface 503 at continuous junction 526. By having a solid top member 525, and one which is joined to the edge member along its entire width, water within the tower is prevented, or substantially inhibited, from leaking through the plug holder and out the front of the tower. Additionally, solid top member 525 helps to prevent unwanted erosion of the plant plug.

Preferably the rear shroud top member 525 extends only a portion of the way from the edge member 501 towards rear tower surface 107, thus insuring (i) plenty of room for root growth out of the plant plug and (ii) that water and nutrients can easily reach the plant plug. However, limiting the length of top member 525 also limits the extent to which it is able to protect the plant plug from erosion. Given this tradeoff, in the preferred embodiment and as illustrated in the cross-sectional view shown in FIG. 4, top member 525 only covers approximately a third of the top surface of plant plug 401. Nevertheless, the plant plug holder may use a top member of a different length than shown in the preferred embodiment. In those configurations utilizing a longer top member, apertures may be included in this member to provide for root growth and water/nutrient flow.

The rear shroud also includes a pair of side members 527. In the preferred and illustrated. embodiment, the upper portion of each side member 527 only extends rearward a portion of the way towards rear tower surface 107. Preferably and as shown, this upper side member portion extends rearward to the same extent as top shroud member 525. As with top member 525, this insures room for plant root growth as well as providing access to water and nutrients. A lower portion 529 of each side member 527, which is highlighted in FIG. 8, extends much further towards rear tower surface 107. Preferably lower side member portion 529 almost touches the rear tower surface 107. In the preferred embodiment, the separation distance between the rearmost edge 531 of the lower portion of each side member 527 and the rear tower surface 107 is less than 2.54 millimeters (0.1 inches), and more preferably set at approximately 1.78 millimeters (0.07 inches). Extending the lower side member portions helps to define and maintain the position of the plant plug within the plug holder 105. As with base member 517, preferably a small gap is provided between rearmost edge 531 and the rear tower surface 107 to insure that surface 503 of the plant plug holder can fit snugly against, and be sealed to, the tower face 101.

In at least one embodiment, there is a fillet 533 between the side members 527 and surface 503 of the plug holder's edge member 501. The fillet reduces stress concentrations and improves the fatigue life of the plug holder.

Figure 10:
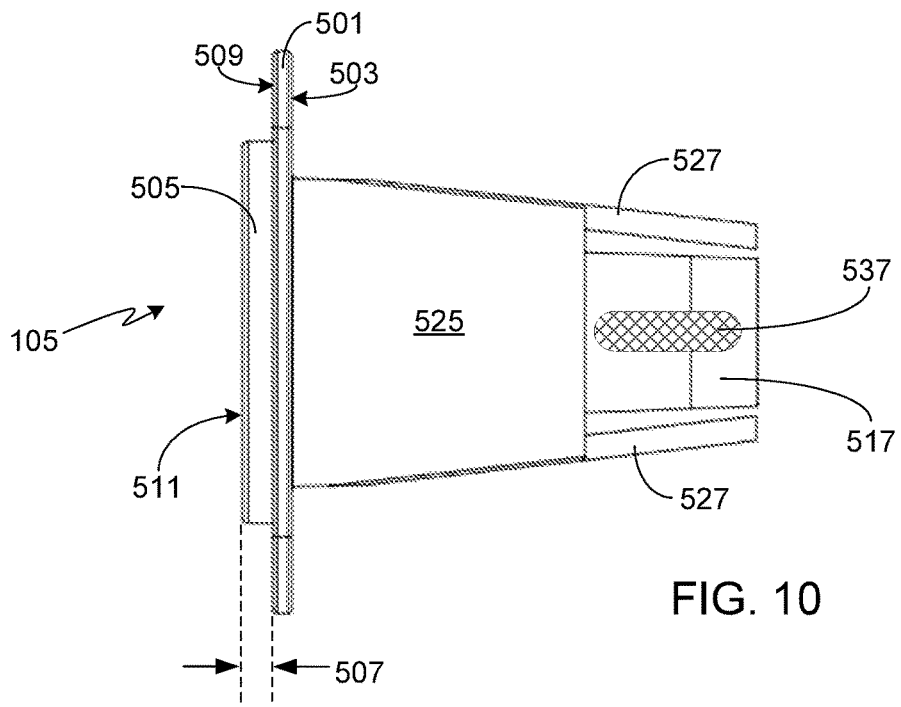
FIG. 10 provides a top view of the plant plug holder shown in FIGS. 5-9.

In the preferred and illustrated embodiment, there is an open slot 535 between side members 527 and base member 517. By providing ample drainage about the plant plug, open regions 535 insure that water does not pool within the plug holder. Additionally by extending the open regions 535 all of the way to surface 503 of the edge member as shown, water is unlikely to leak out of the front of the plug holder. If additional plant plug drainage is desired, one or more apertures can be integrated into base member 517. For example, FIG. 10 shows an elongated aperture 537 located within base member 517. Note that aperture 537 is shown in phantom as it is neither required nor included in the preferred embodiment of the invention. It should be understood that while continuous open slots 535 are preferred in order to maximize drainage, these slots could be replaced with a series of drainage apertures. For example, the side members could extend to the base member, and a series of apertures could be integrated into the side members where the apertures are positioned along the top of the base member to prevent pooling.

The four members comprising the plug holder, specifically top member 525, base member 517, and side members 527, are preferably tapered inwards as shown. The tapering angle is preferably slightly sharper than the tapering angle used on the plant plug (e.g., plant plug 401). For example, the sides of a typical plant plug are tapered at approximately 12 degrees. For this example the members comprising the plug holder are preferably tapered at approximately 14 degrees. By using a greater tapering angle than that of the plant plug, the plug must be compressed slightly as it is inserted into the plug holder, resulting in a tight fit. Given that the plug is comprised of soil or other suitable growth medium, plug compression does not create a problem during plug insertion into the holder. As noted above, preferably during plant plug insertion the plug is pressed into the plug holder until the plug's rearmost portion is resting against inner rear tower surface 107. It should be understood that top member 525, base member 517, and the side members may utilize the same, or different, taper angles.

Figure 11:
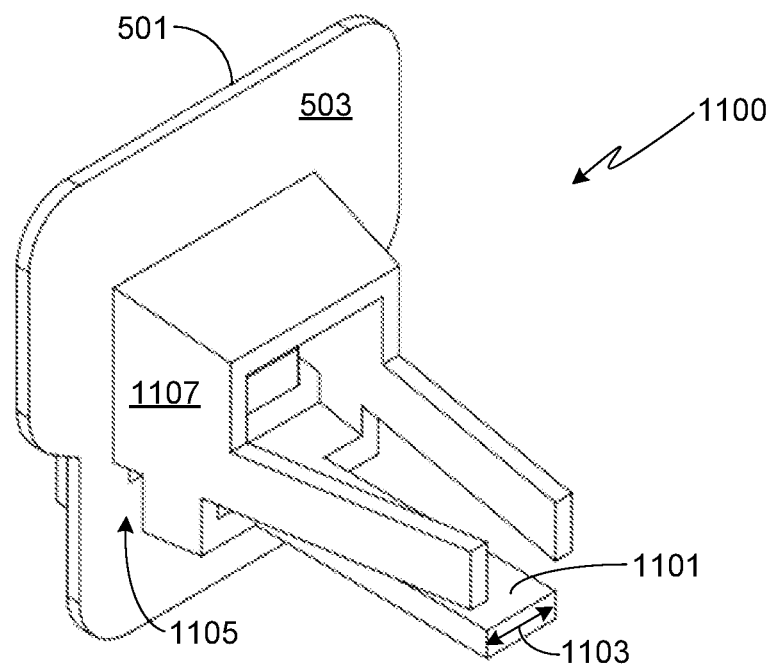
FIG. 11 provides a perspective view of an alternate embodiment of the plant plug holder.
Figure 12:
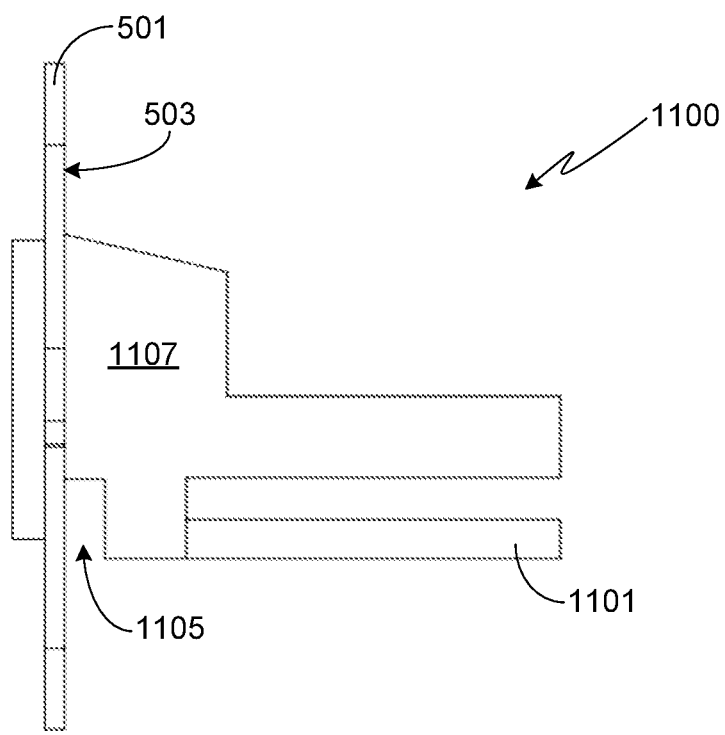
FIG. 12 provides a side view of the embodiment shown in FIG. 11.
Figure 13:
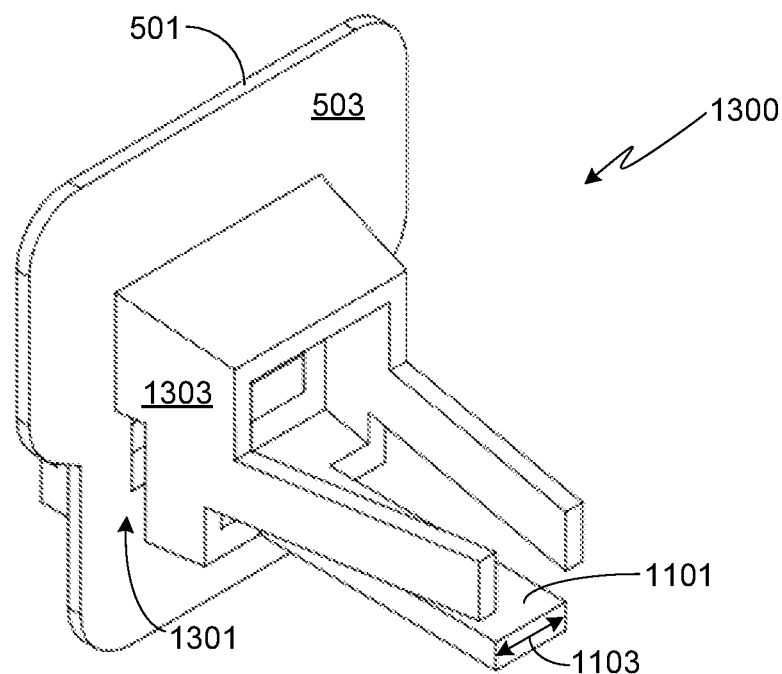
FIG. 13 provides a perspective view of an alternate embodiment of the plant plug holder.
Figure 14:
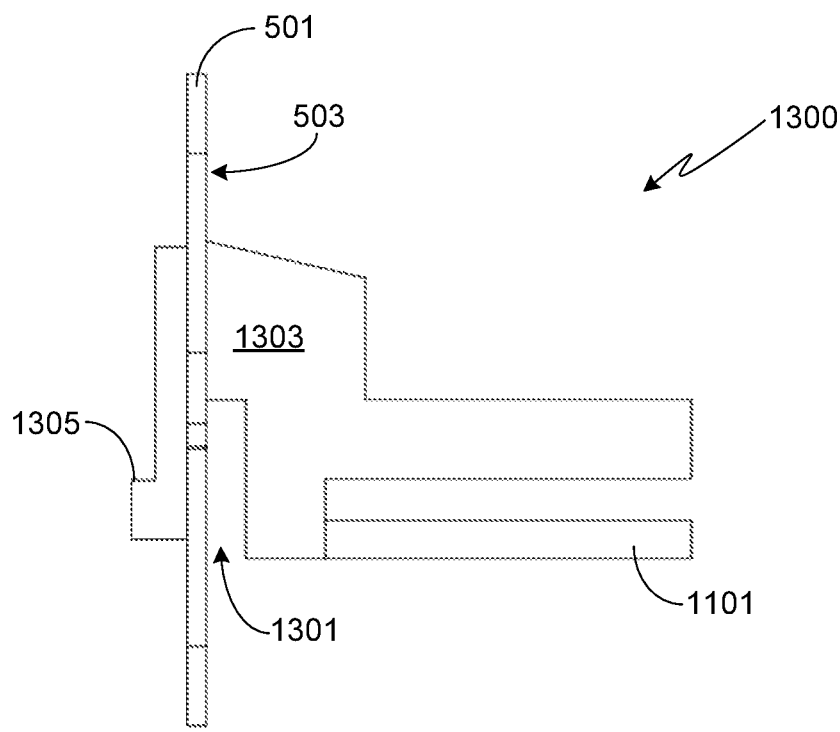
FIG. 14 provides a side view of the embodiment shown in FIG. 13.

While the embodiment illustrated in FIGS. 5-10 is preferred, it will be appreciated that plant plug holder 105 may be modified without departing from the essential characteristics of the design. FIGS. 11-41 illustrate some variations on the preferred plant plug holder. Plant plug holder 1100, shown in FIGS. 11 and 12, utilizes a horizontal base member 1101. As noted above, one of the benefits of this approach is that it is easier to transplant into and out of the holder. To prevent, or at least minimize, leaks from the front of the plug holder, the width 1103 of the base member is relatively narrow. Additionally, a gap 1105 is integrated into the rear shroud. Due to gap 1105, base member 1101 does not extend all of the way to the back surface 503 of edge member 501. Note that gap 1105 also extends part way up side members 1107. The same approach is used in plant plug holder 1300, shown in FIGS. 13 and 14, except that the gap in the rear shroud, i.e., gap 1301, extends further up into side members 1303. By increasing the size of the rear shroud gap, from gap 1105 to gap 1301, it is easier for water to drain away from the plant plug and the base member without leaking out of the front of the plug holder. Note that the front shroud of plant plug holder 1300 also includes an extended lower lip 1305 which acts as a reservoir to further inhibit leakage.

Figure 15:
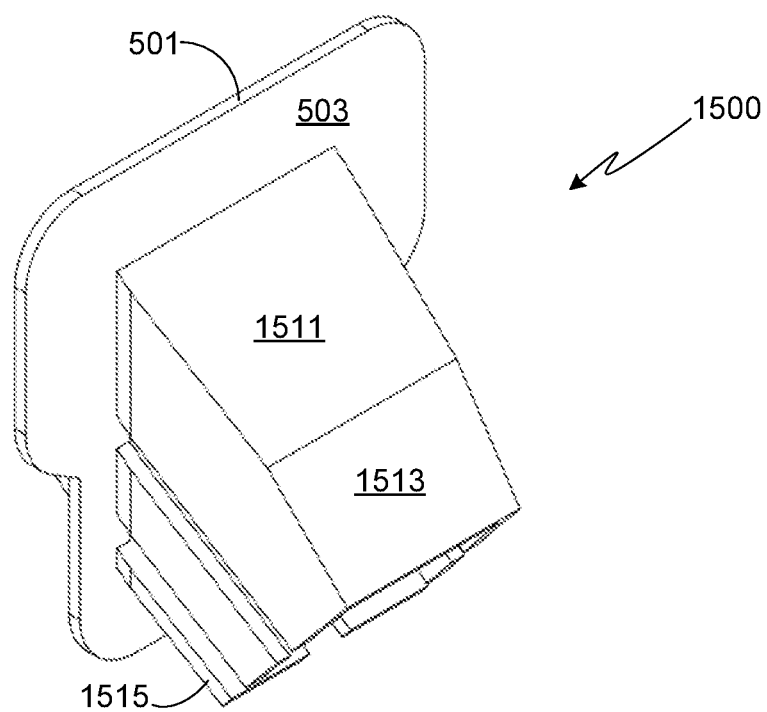
FIG. 15 provides a perspective view of an alternate embodiment of the plant plug holder.
Figure 16:
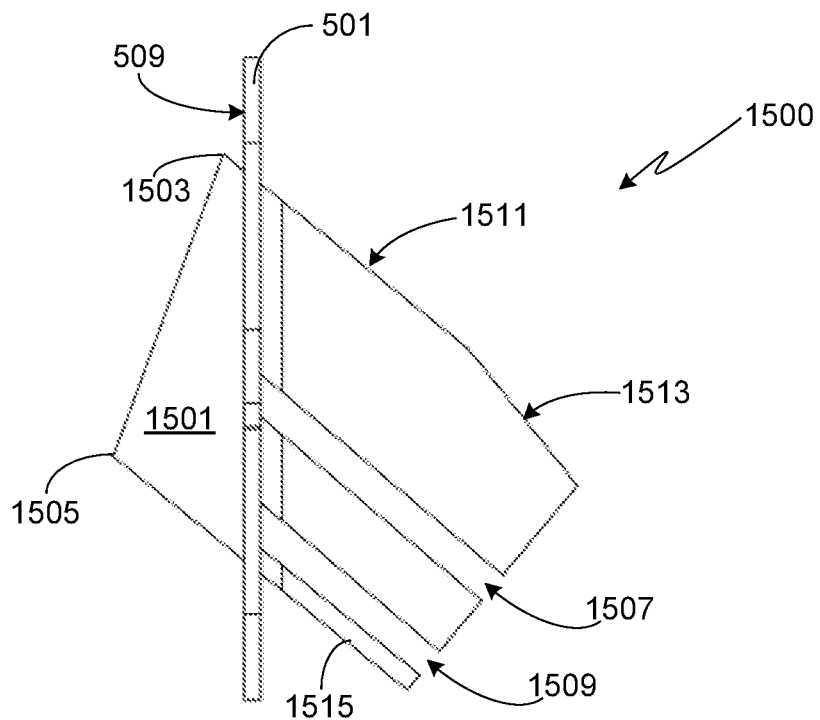
FIG. 16 provides a side view of the embodiment shown in FIG. 15.

Embodiment 1500, shown in FIGS. 15 and 16, utilizes a front shroud 1501 that is not parallel with the front face 509 of edge member 501. Rather, the top edge 1503 of front shroud 1501 is closer to face 509 than is the bottom edge 1505. By increasing the distance between the front face of the edge member and the lower portion of the front shroud lip, leakage from the plant holder is further inhibited. This embodiment also illustrates the use of dual open regions, e.g., slots 1507 and 1509, to insure adequate area for plant plug drainage. Although not clearly visible in FIGS. 15 and 16, it should be understood that the other side member includes matching dual slots. Note that in embodiment 1500, the top member of the rear shroud extends back further than in embodiment 105, thus providing further erosion protection for the plant plug. Additionally, the rear shroud top member in this embodiment is comprised of two, non-planar portions, a first portion 1511 nearest edge member 501 and a second portion 1513 nearest the rear tower surface. In this embodiment, top member portion 1511 is approximately parallel with base member 1515 while top member portion 1513 is angled towards base member 1515.

Figure 17:
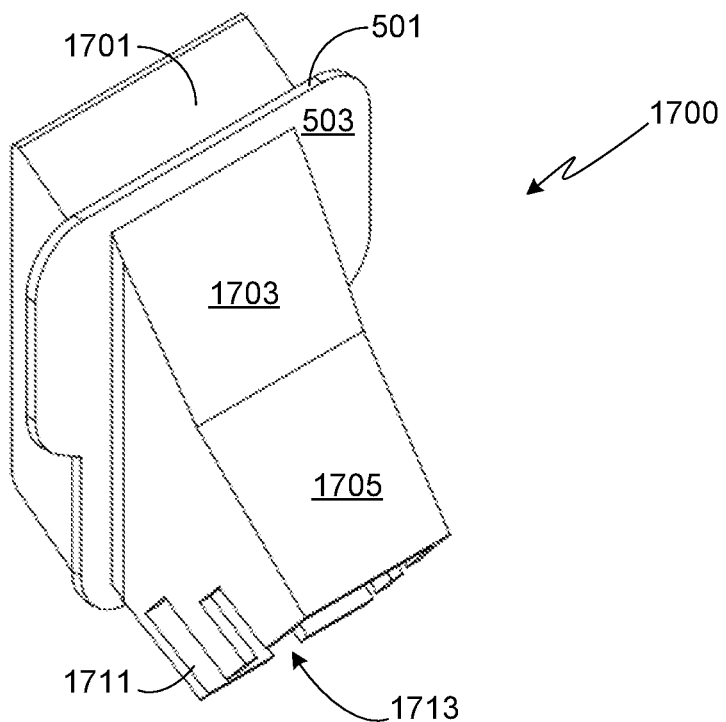
FIG. 17 provides a perspective view of an alternate embodiment of the plant plug holder.
Figure 18:
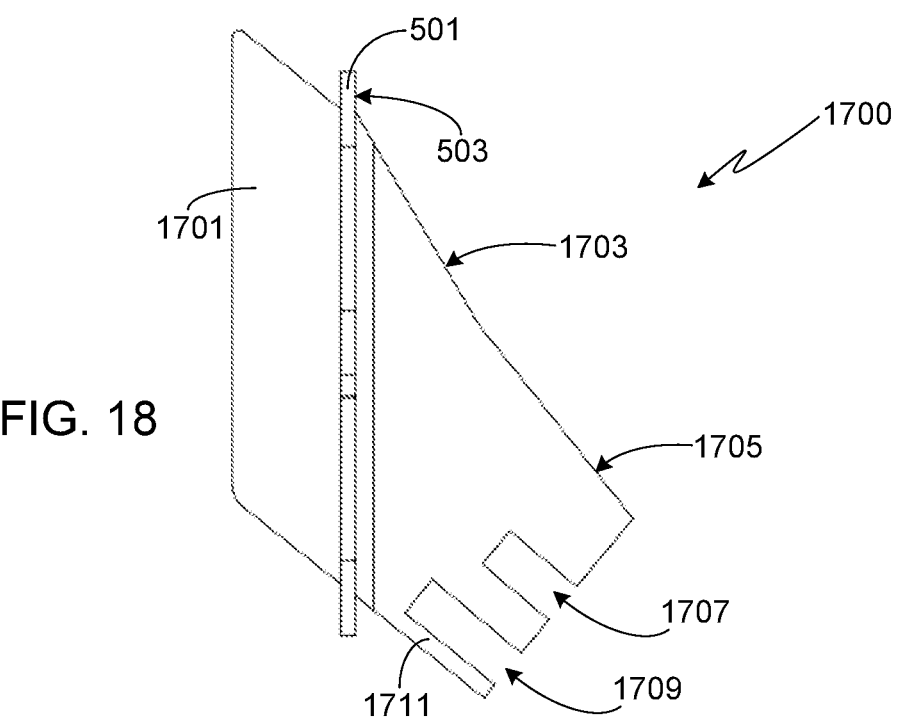
FIG. 18 provides a side view of the embodiment shown in FIG. 17.
Figure 19:
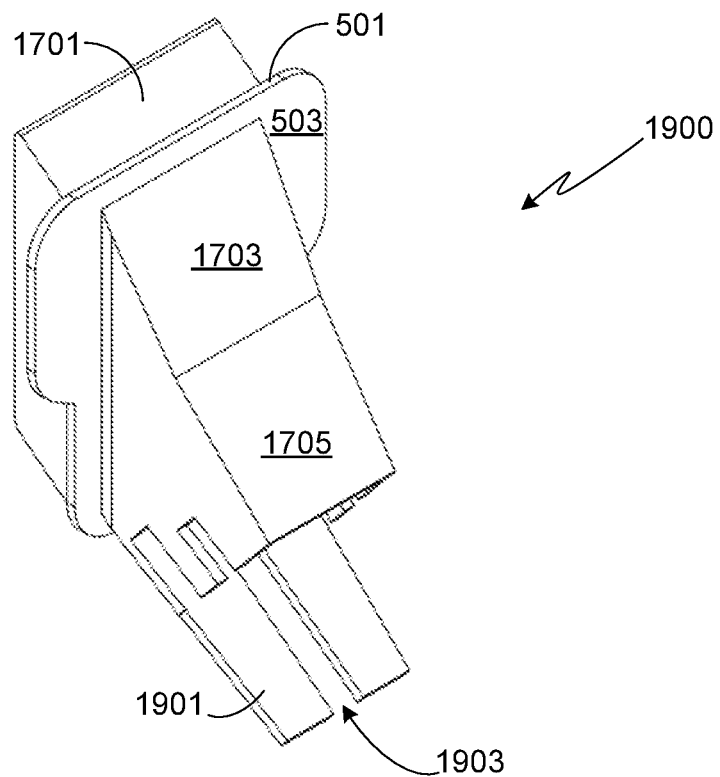
FIG. 19 provides a perspective view of an alternate embodiment of the plant plug holder.
Figure 20:
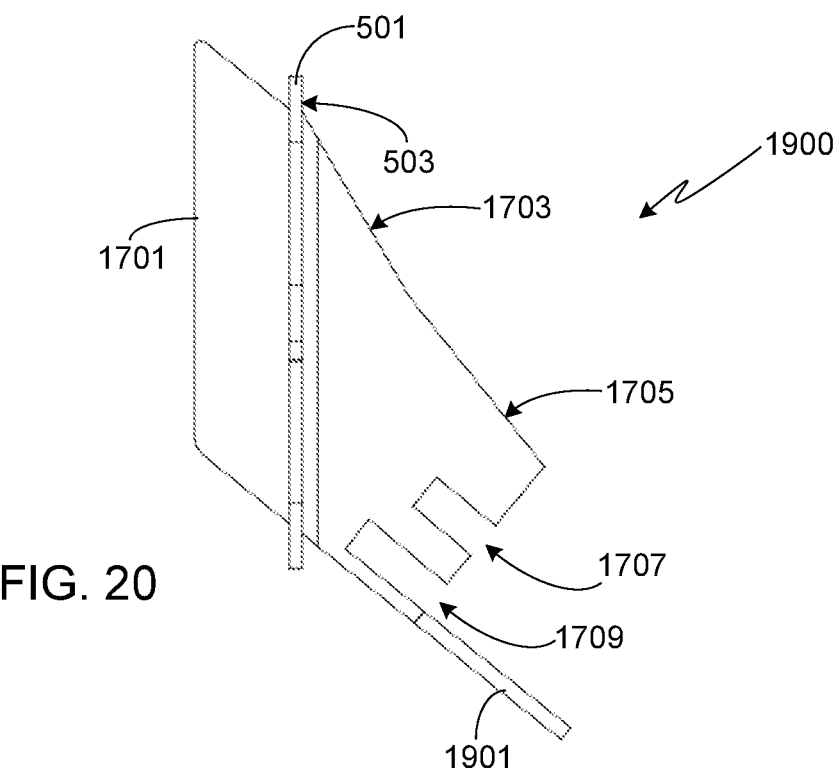
FIG. 20 provides a side view of the embodiment shown in FIG. 19.

Embodiment 1700 shown in FIGS. 17 and 18, and embodiment 1900 shown in FIGS. 19 and 20, utilize a front shroud 1701 that extends further from edge member 501 than the front shroud in preferred embodiment 105. By extending the front shroud further from the edge member, leakage from the front of the plug holder is further inhibited. These two embodiments also utilize a rear shroud top member comprised of two non-planar portions as in the previous embodiment, however unlike embodiment 1500, portion 1703 nearest edge member 501 has a higher taper angle that rearmost portion 1705. Also unlike embodiment 1500, the slots 1707 and 1709 in embodiments 1700 and 1900 do not extend all of the way to surface 503 of the edge member 501 as do slots 1507 and 1509 in embodiment 1500. The difference between embodiments 1700 and 1900 is that base member 1901 is longer than base member 1711, extending further towards the rear tower surface. Note that in these embodiments, the base member includes a drainage slot, i.e., slot 1713 in base member 1711 and slot 1903 in base member 1901.

Figure 21:
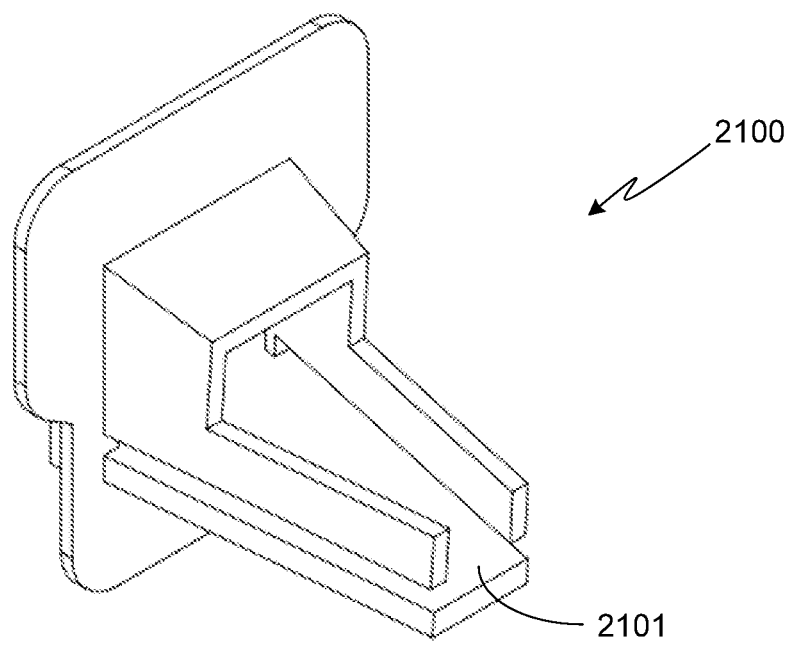
FIG. 21 provides a perspective view of an alternate embodiment of the plant plug holder.
Figure 22:
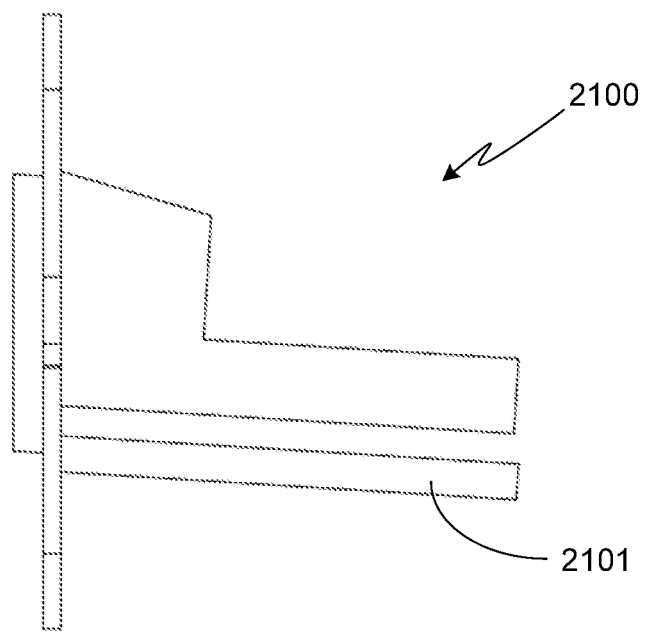
FIG. 22 provides a side view of the embodiment shown in FIG. 21.
Figure 23:
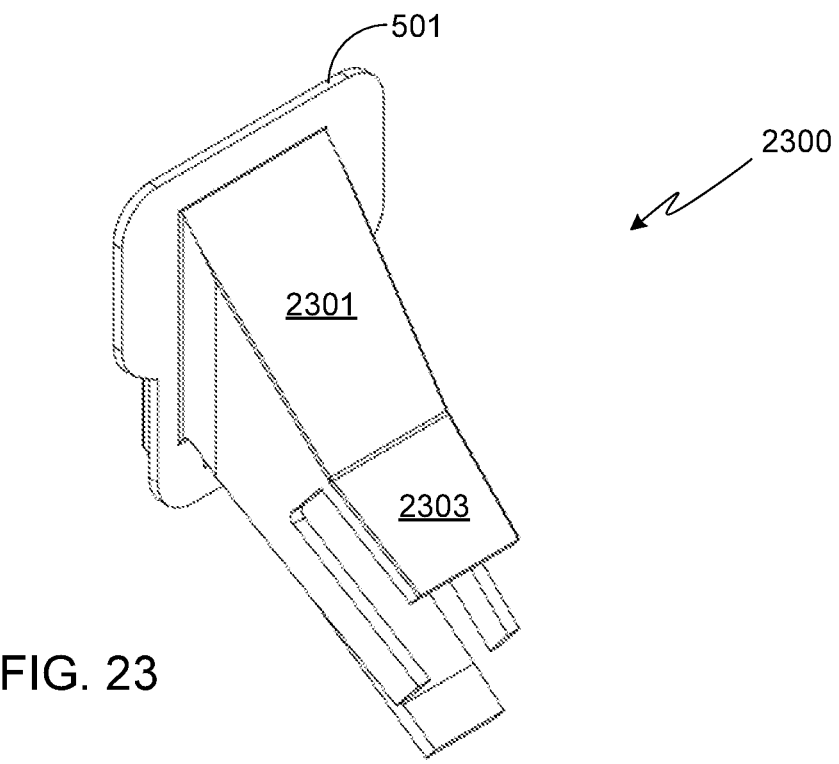
FIG. 23 provides a perspective view of an alternate embodiment of the plant plug holder.
Figure 24:
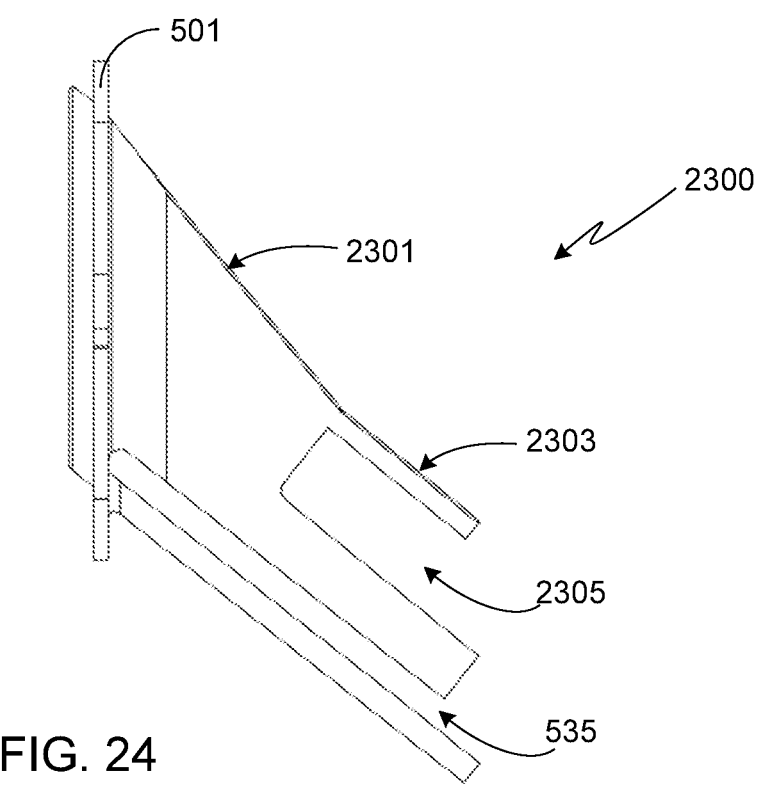
FIG. 24 provides a side view of the embodiment shown in FIG. 23.
Figure 25:
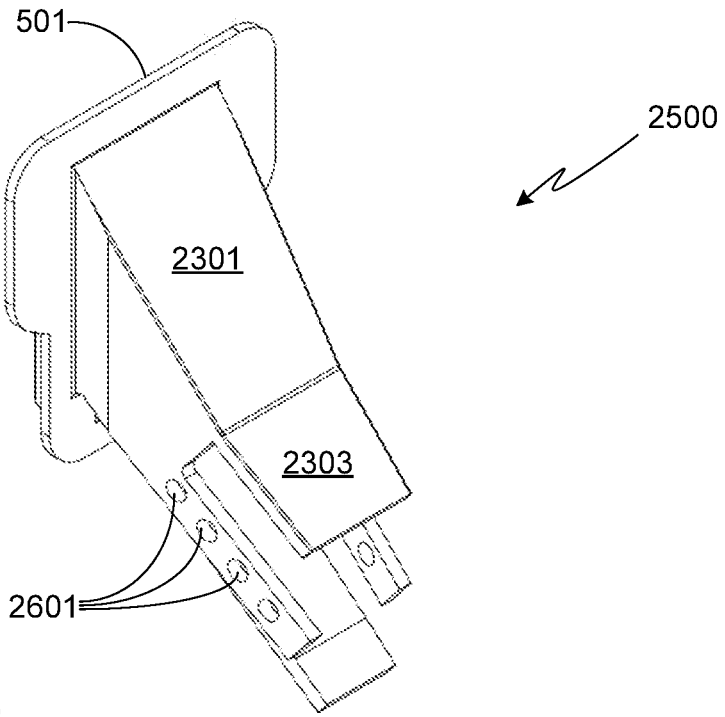
FIG. 25 provides a perspective view of an alternate embodiment of the plant plug holder.
Figure 26:
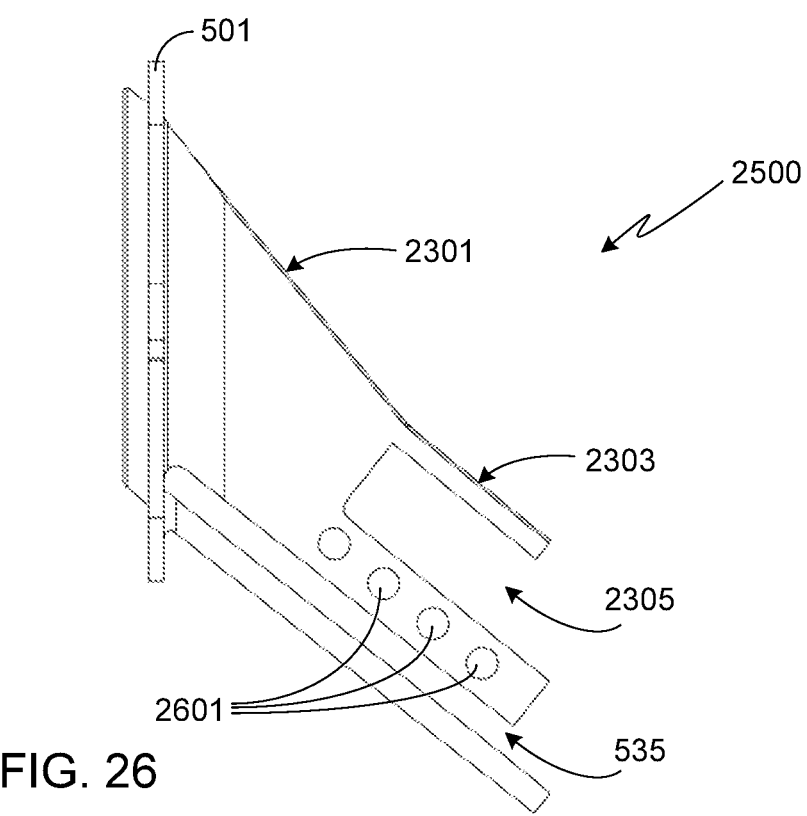
FIG. 26 provides a side view of the embodiment shown in FIG. 25.
Figure 27:
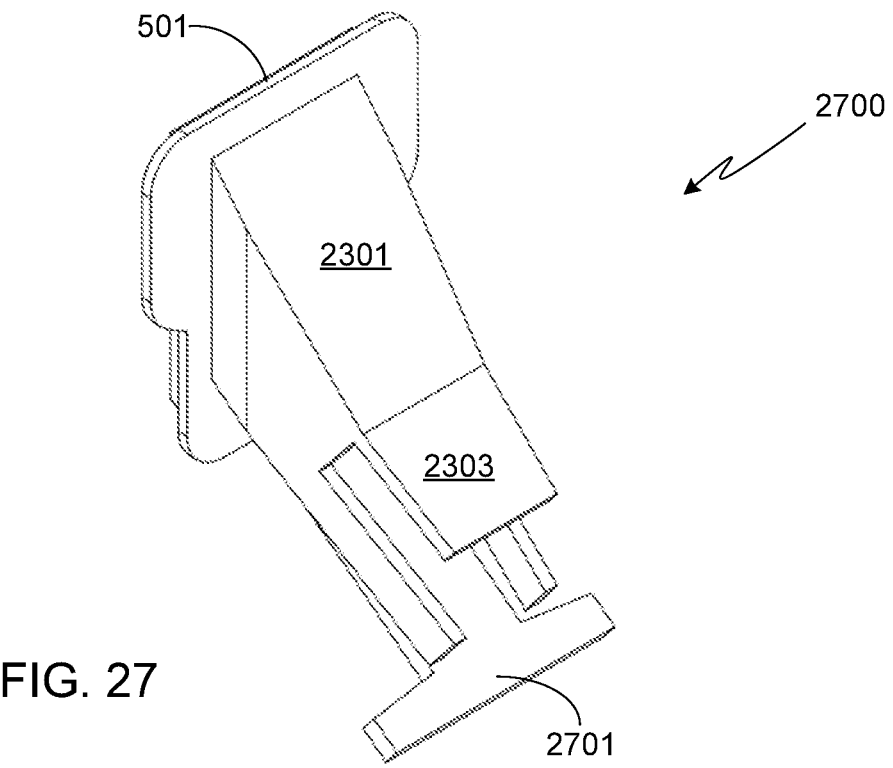
FIG. 27 provides a perspective view of an alternate embodiment of the plant plug holder.
Figure 28:
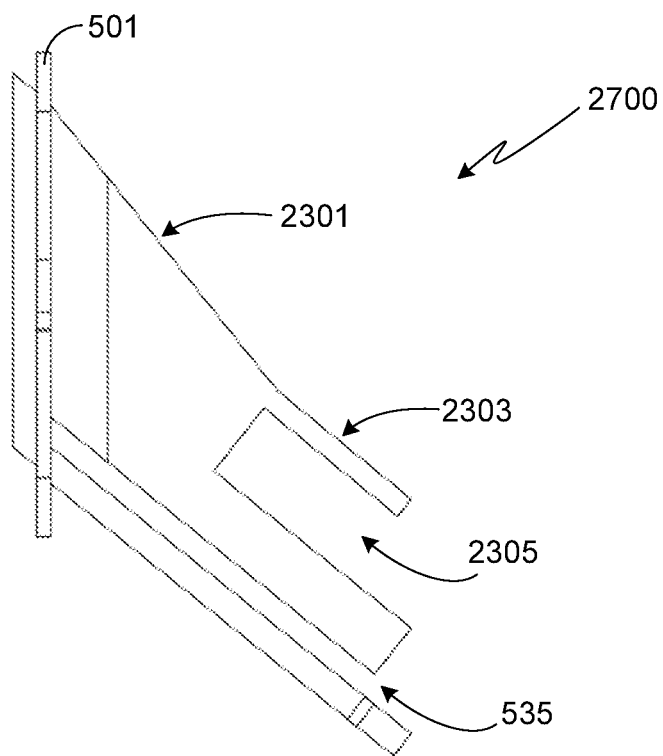
FIG. 28 provides a side view of the embodiment shown in FIG. 27.
Figure 29:
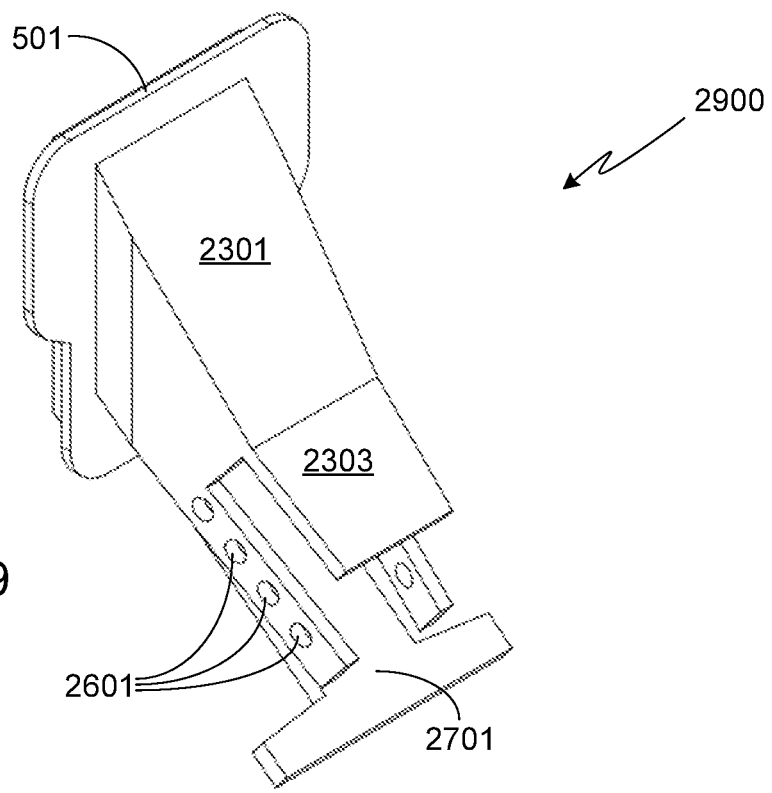
FIG. 29 provides a perspective view of an alternate embodiment of the plant plug holder.
Figure 30:
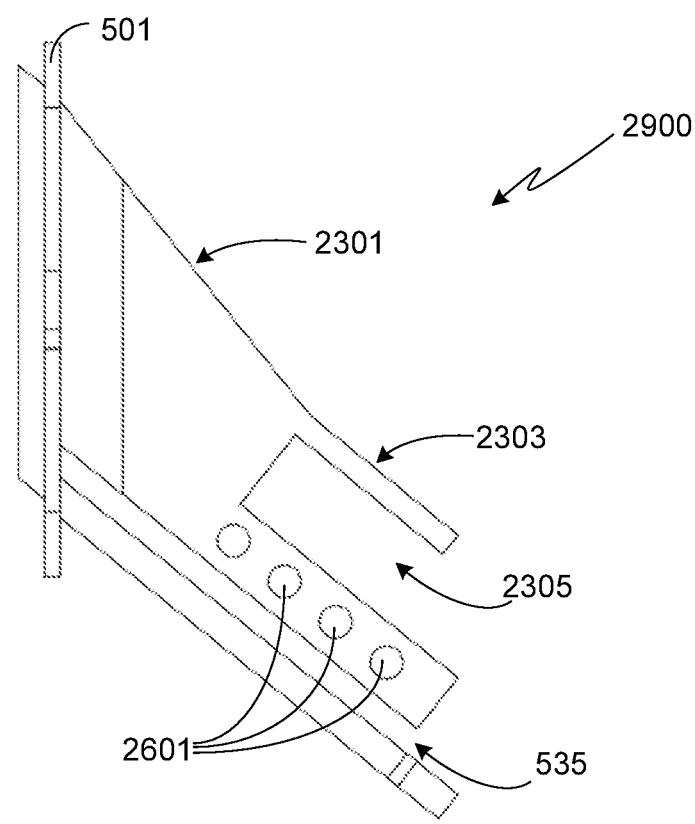
FIG. 30 provides a side view of the embodiment shown in FIG. 29.
Figure 31:
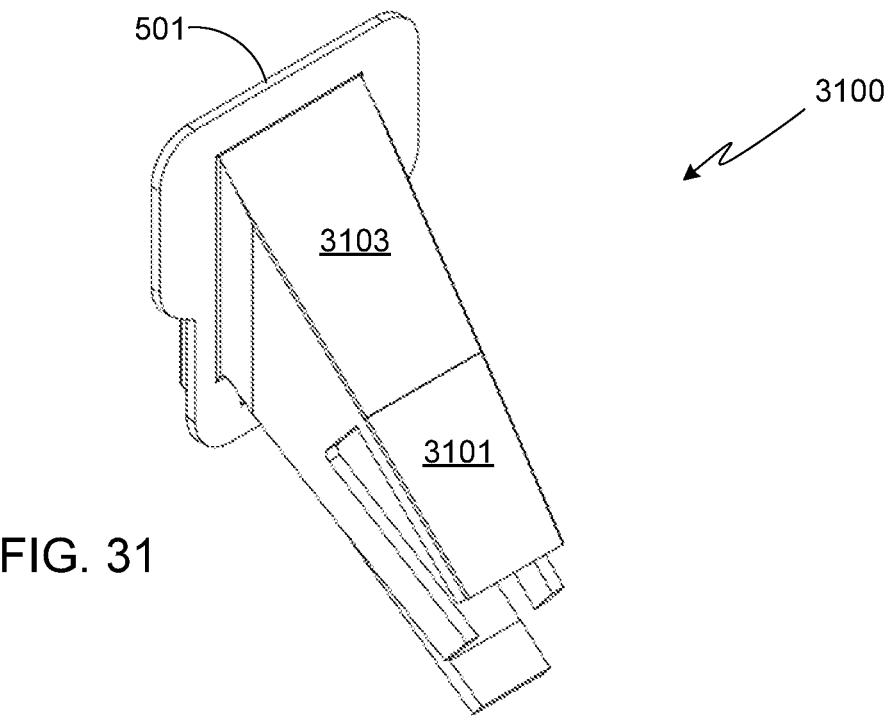
FIG. 31 provides a perspective view of an alternate embodiment of the plant plug holder.
Figure 32:
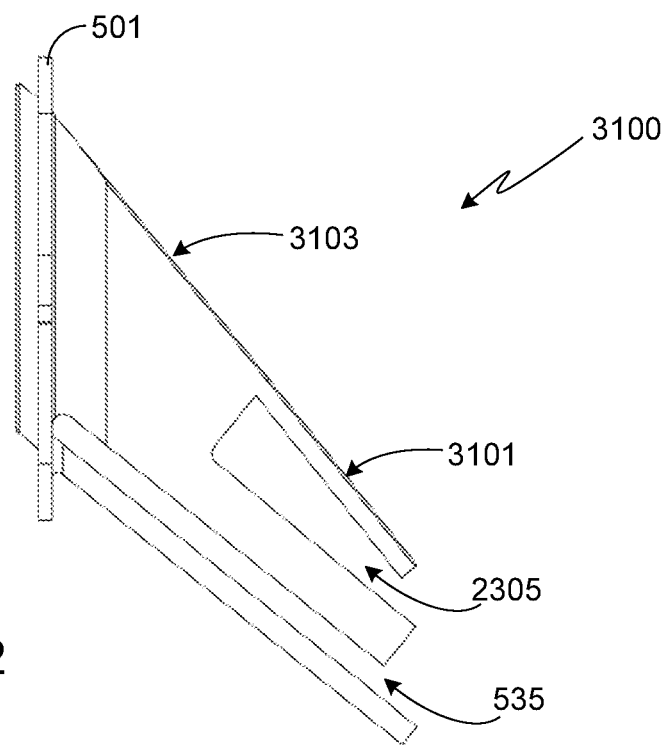
FIG. 32 provides a side view of the embodiment shown in FIG. 31.
Figure 33:
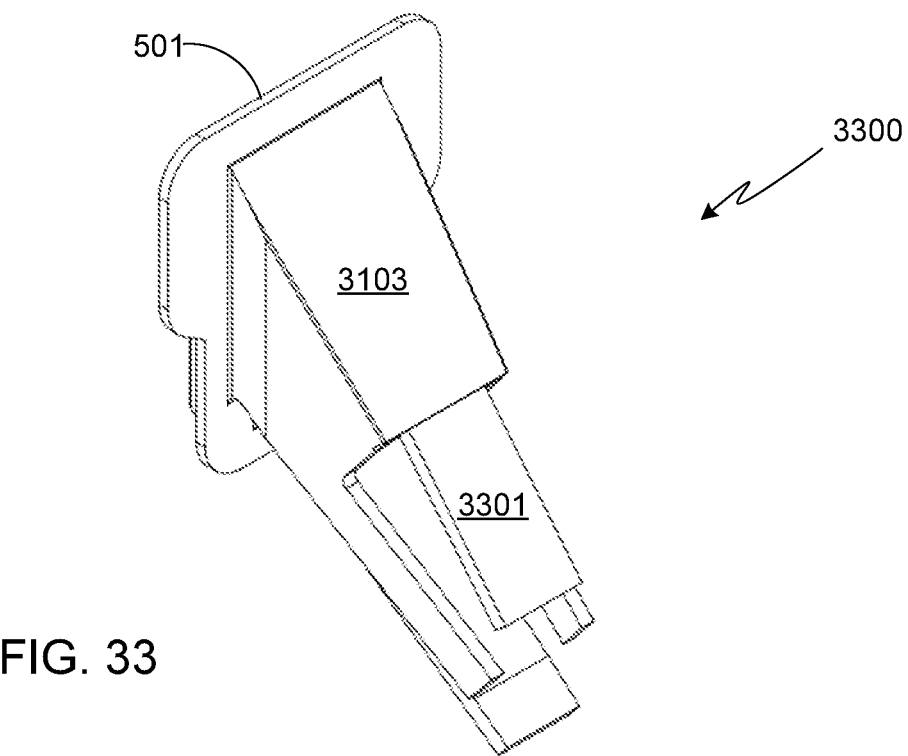
FIG. 33 provides a perspective view of an alternate embodiment of the plant plug holder.
Figure 34:
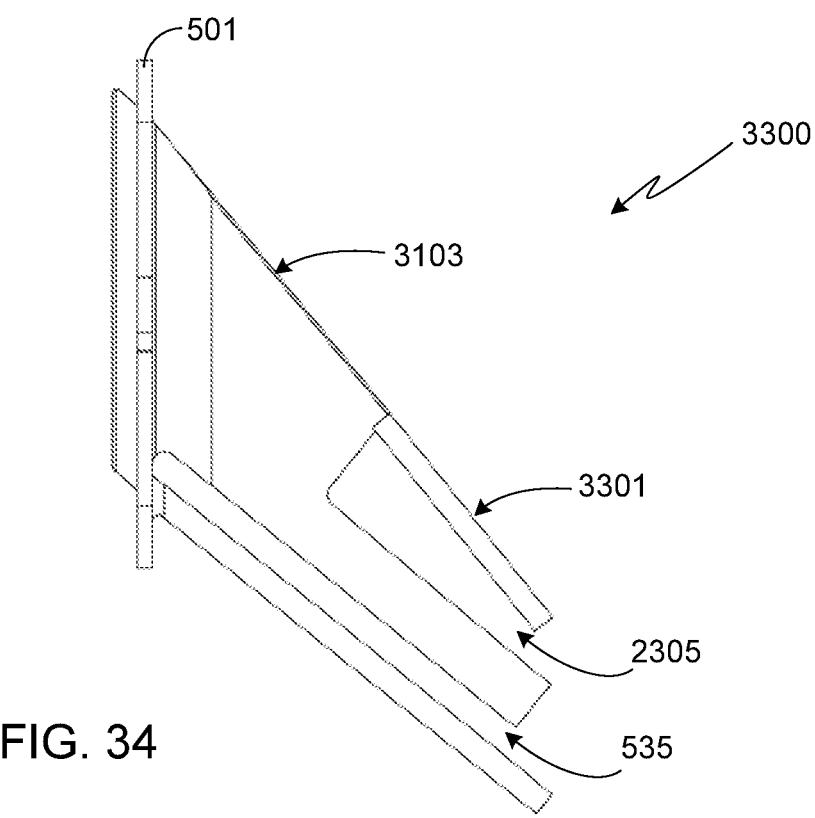
FIG. 34 provides a side view of the embodiment shown in FIG. 33.
Figure 35:
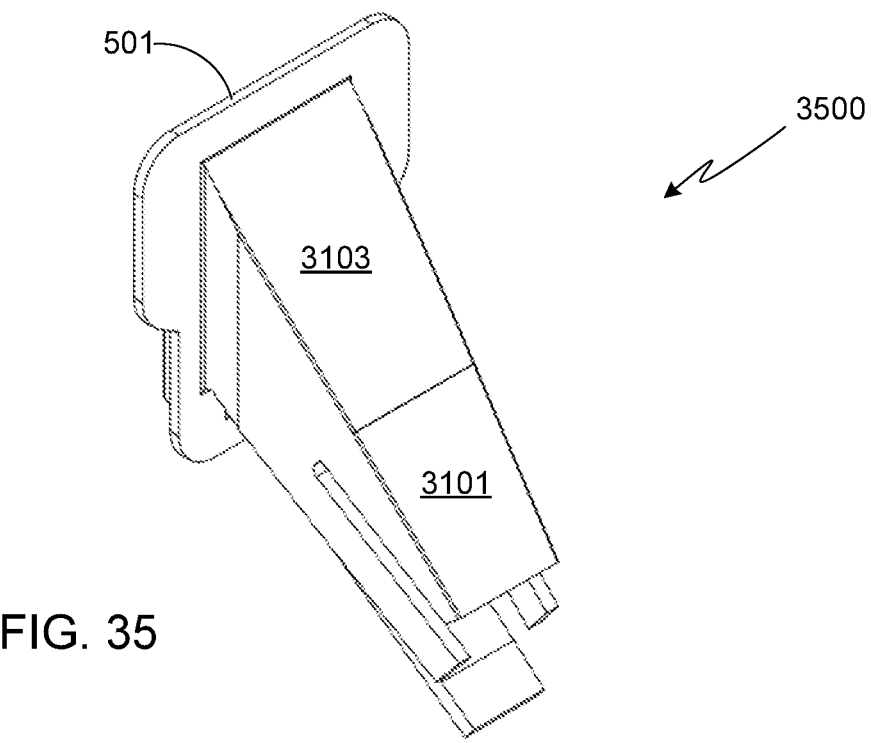
FIG. 35 provides a perspective view of an alternate embodiment of the plant plug holder.
Figure 36:
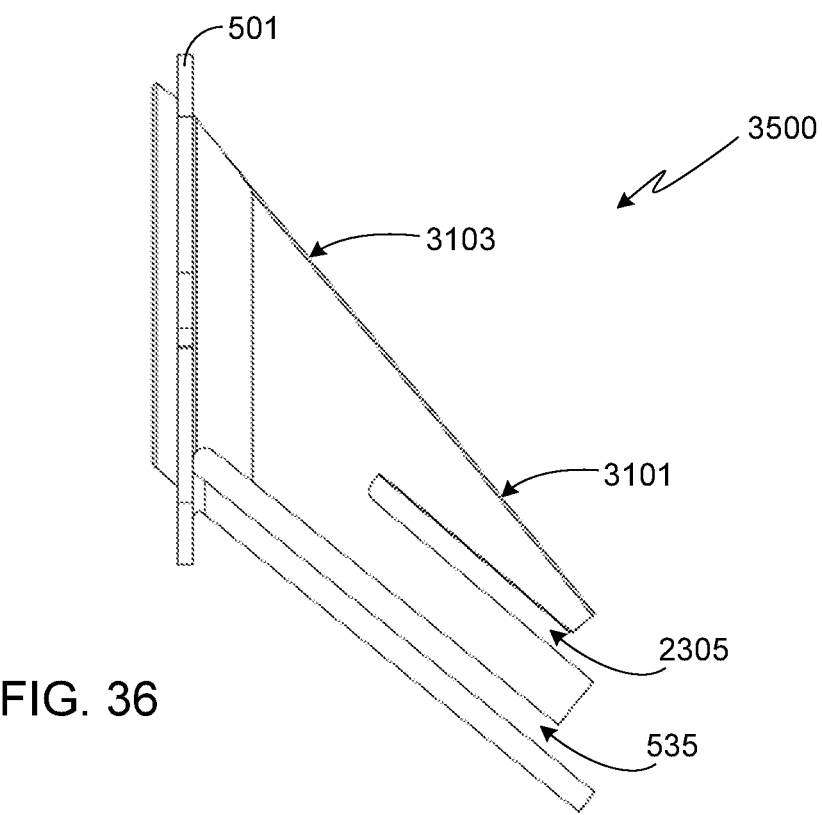
FIG. 36 provides a side view of the embodiment shown in FIG. 35.
Figure 37:
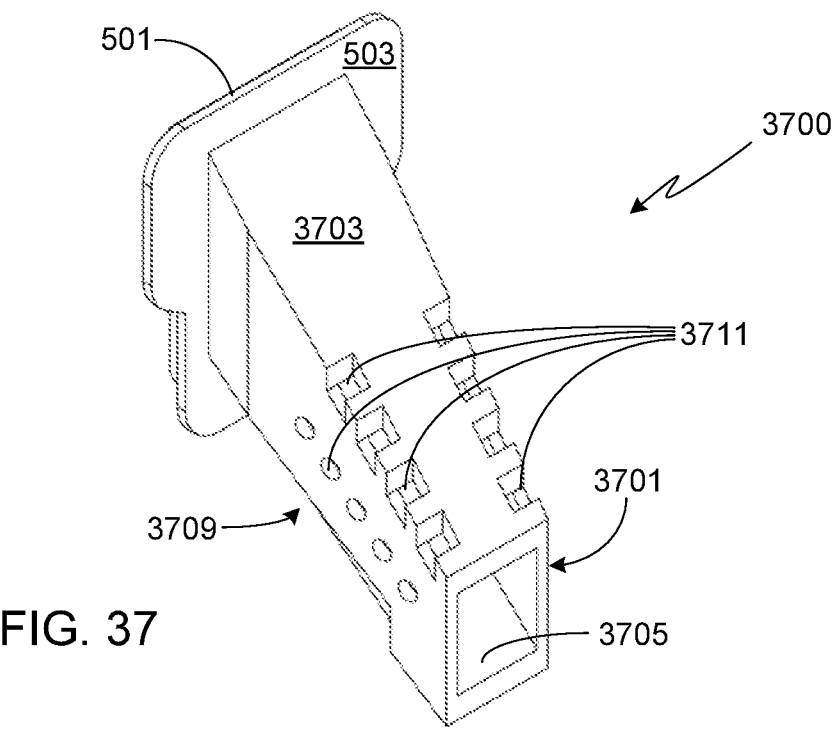
FIG. 37 provides a perspective view of an alternate embodiment of the plant plug holder.
Figure 38:
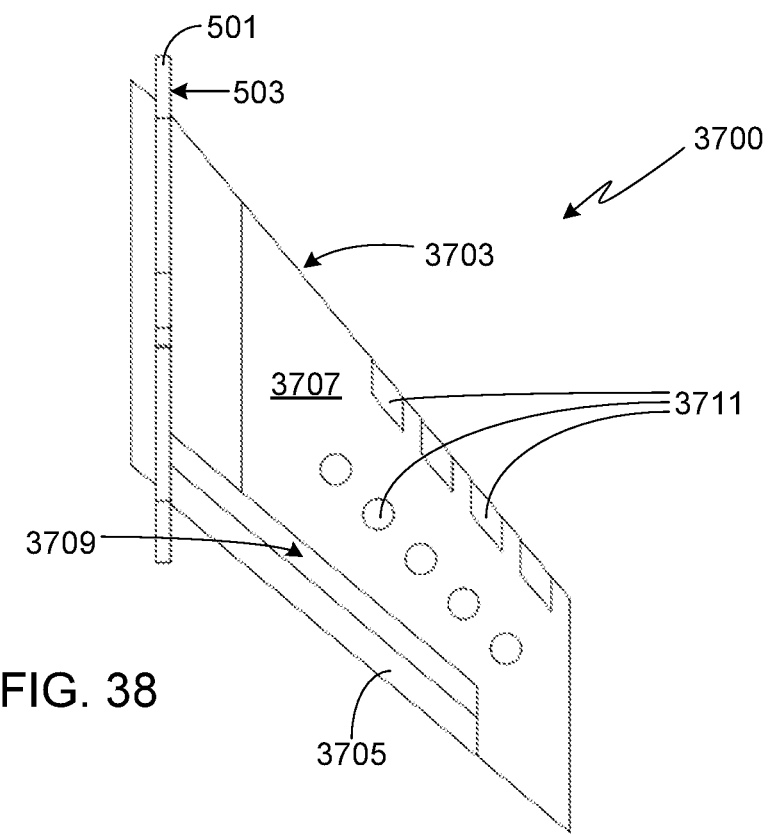
FIG. 38 provides a side view of the embodiment shown in FIG. 37.
Figure 39:
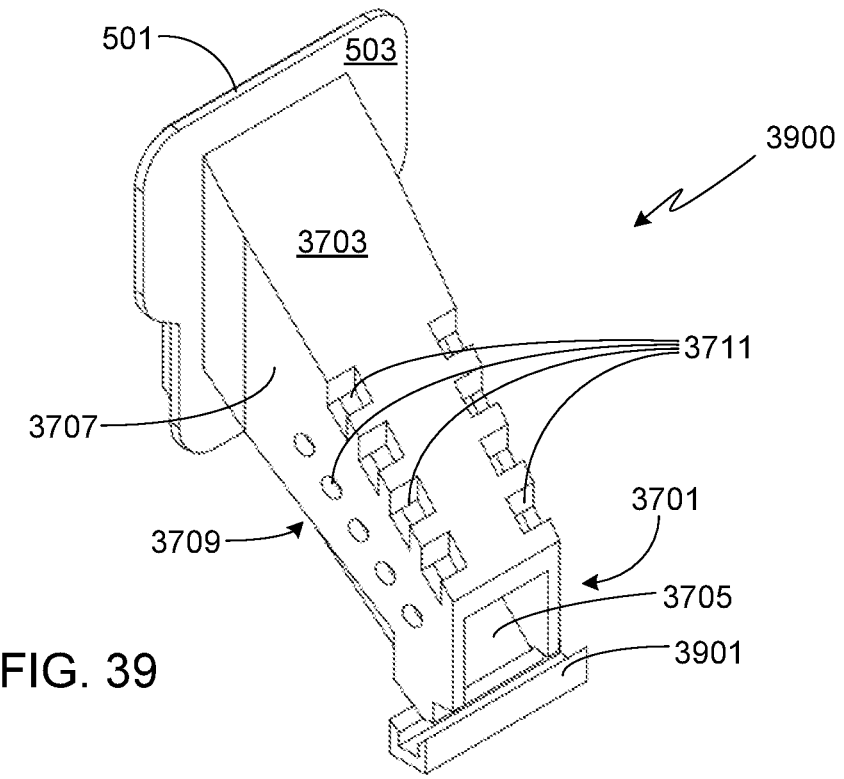
FIG. 39 provides a perspective view of an alternate embodiment of the plant plug holder.
Figure 40:
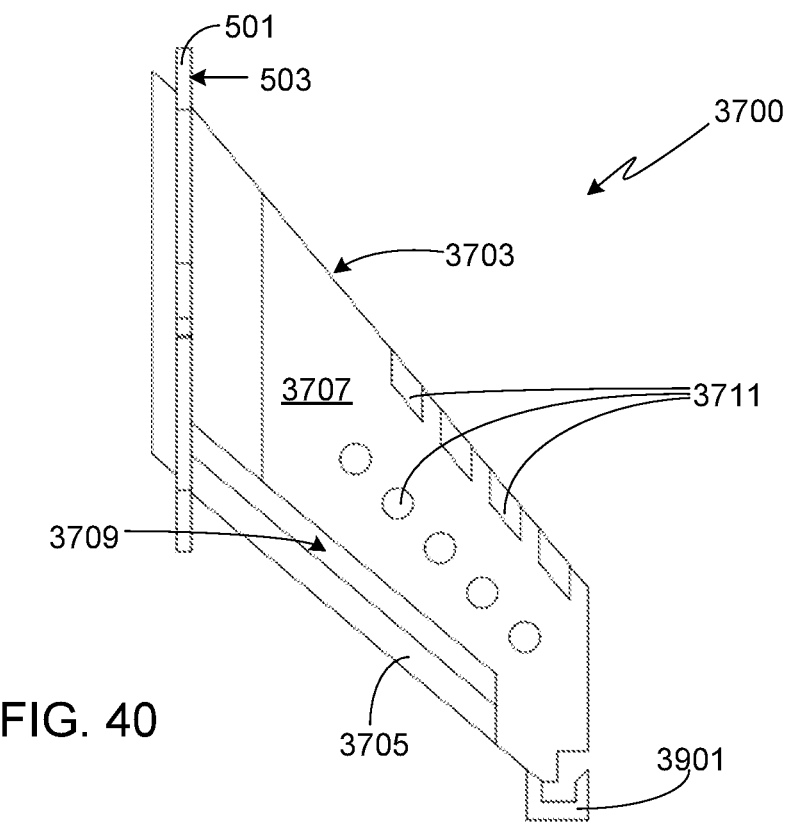
FIG. 40 provides a side view of the embodiment shown in FIG. 39.

Embodiment 2100, shown in FIGS. 21 and 22, is similar to the preferred embodiment. The primary difference between these embodiments is that base member 2101 of embodiment 2100 is nearly horizontal. In this embodiment, preferably base member 2101 is tilted down approximately 10 degrees off the horizontal.

Embodiment 2300 (FIGS. 23 and 24), embodiment 2500 (FIGS. 25 and 26), embodiment 2700 (FIGS. 27 and 28), embodiment 2900 (FIGS. 29 and 30), embodiment 3100 (FIGS. 31 and 32), embodiment 3300 (FIGS. 33 and 34), and embodiment 3500 (FIGS. 35 and 36) are all similar in design and configuration to the preferred embodiment 105. Unlike embodiment 105, however, these embodiments utilize a rear shroud top member comprised of two, non-planar portions that extend much further into the tower cavity than top member 525 of embodiment 105, thereby providing further erosion protection to the plant plug. In embodiments 2300, 2500, 2700 and 2900, portion 2301 nearest edge member 501 has a higher taper angle that rearmost portion 2303. In embodiments 3100, 3300 and 3500, portion 3101 furthest from edge member 501 has a higher taper angle that portion 3103. Note that in embodiments 3100, 3300 and 3500, the difference between taper angles is relatively small. Furthermore, in embodiment 3300 the rearmost portion 3301 of the rear shroud top member is narrower than the forward portion of the top member. Additionally, due to the extended rear shroud top member, in each of these embodiments (i.e., embodiments 2300, 2500, 2700, 2900, 3100, 3300 and 3500) a secondary open region, preferably a slot 2305 as shown, is included in each side member. Embodiments 2500 and 2900 also include a plurality of apertures 2601 in each side member, these apertures providing additional space for root growth. Note that the rearmost portion 2701 of the base member in embodiments 2700 and 2900 has been widened in order to enhance water/nutrient delivery and provide increased support for the rearmost plant plug roots.

In embodiments 3700 and 3900 the rearmost portion 3701 of the rear shroud links together the top member 3703, base member 3705, and left and right side members 3707, thereby giving additional support for the base member while providing further erosion protection to the plant plug. To provide drainage, on either side of the plug holder there is a slot 3709 that is adjacent to base member 3705 and that extends from surface 503 of edge member 501 to rearmost portion 3701. To insure adequate space for root growth, a plurality of apertures 3711 are located on side members 3707 and top member 3703. Note that embodiment 3900 also includes a trough member 3901 that enhances water/nutrient delivery.

Figure 41:
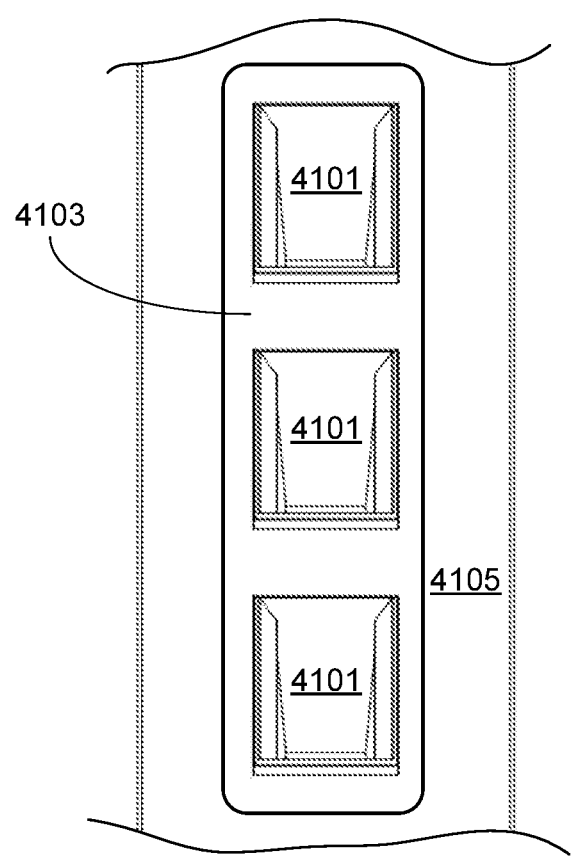
FIG. 41 provides a front planar view of an alternate embodiment in which multiple plant plug holders are fabricated and installed as a single unit.

While the embodiments described above, including the preferred embodiment, utilize a single tower cut-out 103 per plant plug holder 105, it should be understood that other configurations may be used with the invention. For example, multiple plant plug holders may be fabricated as a single unit and then installed into a cut-out sized to accommodate the multi-holder unit. FIG. 41 illustrates such a configuration. As shown in this exemplary embodiment, three plug holders 4101 are formed as a single unit. A single edge member 4103, which surrounds all three plug holders 4101, is attached to tower face 4105 in the same way that edge member 501 is attached to tower face 101 in the previously described embodiment, for example by bonding (e.g., solvent bonding) or welding (e.g., ultrasonic welding). This approach allows multiple plug holders to be simultaneously mounted to the tower face, thereby reducing manufacturing time.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A hydroponic tower comprising:
 a cavity defined by a front tower surface and an inside rear surface opposite the front tower surface, wherein the front tower surface includes a cut-out; and
 a plant plug holder inserted into the cut-out, the plant plug holder comprising:
  an edge member, said edge member encircling a plant plug holder opening, said plant plug holder opening configured to receive a plant plug, wherein a back surface of said edge member is proximate to the front tower surface;
  a base member extending rearward from said back surface of said edge member, said base member extending into the cavity such that a rearmost edge of said base member is substantially adjacent to the inside rear surface of the cavity wherein when a plant plug is fully inserted into the plant plug holder the plant plug contacts the inside rear surface of the cavity;

a rear shroud extending rearward from said back surface of said edge member, said rear shroud extending into said cavity, said rear shroud comprising:
a top member;
a first side member; and
a second side member; and
a front shroud, said front shroud extending out and away from a front surface of said edge member, wherein said front shroud encircles said plant plug holder opening.

2. The hydroponic tower of claim 1, further comprising a seal formed between said back surface of said edge member and said front tower surface, wherein said seal circumscribes said plant plug holder opening.

3. The hydroponic tower of claim 2, wherein said seal is formed by bonding said back surface of said edge member to said front tower surface.

4. The hydroponic tower of claim 2, wherein said seal is formed by ultrasonically welding said back surface of said edge member to said front tower surface.

5. The hydroponic tower of claim 1, wherein a front lip of said front shroud is parallel to said front tower surface.

6. The hydroponic tower of 1, wherein an upper face of a lower lip of said front shroud is collinear with a top surface of said base member.

7. The hydroponic tower of claim 1, said base member angled downwards when said plant plug holder is fully inserted into said cut-out.

8. The hydroponic tower of claim 7, said base member angled downwards at an angle in the range of 10 degrees to 60 degrees.

9. The hydroponic tower of claim 8, said base member angled downwards at an angle in the range of 40 degrees to 50 degrees.

10. The hydroponic tower of claim 1, wherein said base member is horizontally positioned when said plant plug holder is fully inserted into said cut-out of said hydroponic tower.

11. The hydroponic tower of claim 1, wherein the rearmost edge of said base member is located within 2.54 millimeters of said inside rear surface of said cavity.

12. The hydroponic tower of claim 1, wherein said top member is planar.

13. The hydroponic tower of claim 1, said top member comprised of a first planar portion and a second planar portion, wherein said first and second portions are not coplanar.

14. The hydroponic tower of claim 1, said first side member and said second side member each including at least one aperture.

15. The hydroponic tower of claim 14, wherein each aperture of said at least one aperture of said first side member and said second side member is configured as an open-ended slot.

16. The hydroponic tower of claim 1, said base member including at least one aperture.

17. The hydroponic tower of claim 16, wherein said at least one aperture of said base member is configured as an open-ended slot.

18. The hydroponic tower of claim 1, said first side member tapered inwards and said second side member tapered inwards.

19. The hydroponic tower of claim 18, said base member tapered inwards and said top member tapered inwards.

20. The hydroponic tower of claim 19, said first side member tapered inwards, and said second side member tapered inwards.

21. The hydroponic tower of claim 1, said plant plug holder fabricated from a plastic material.

22. The hydroponic tower of claim 21, said plastic material selected from the group consisting of polyethylene, polypropylene, polyvinyl chloride, polytetrafluoroethylene, and acrylonitrile butadiene styrene.

23. The hydroponic tower of claim 1, said plant plug holder fabricated as a single piece.

24. A hydroponic tower comprising:
a cavity defined by a front tower surface and an inside rear surface opposite the front tower surface, wherein the front tower surface includes a cut-out; and
a plant plug holder inserted into the cut-out, the plant plug holder comprising:
an edge member, said edge member encircling a plant plug holder opening, said plant plug holder opening configured to receive a plant plug, wherein a back surface of said edge member is proximate to the front tower surface;
a base member extending rearward from said back surface of said edge member, said base member extending into the cavity such that a rearmost edge of said base member is substantially adjacent to the inside rear surface of the cavity wherein when a plant plug is fully inserted into the plant plug holder the plant plug contacts the inside rear surface of the cavity;
a rear shroud extending rearward from said back surface of said edge member, said rear shroud extending into said cavity, said rear shroud comprising:
a top member;
a first side member; and
a second side member;
wherein said top member of said rear shroud extends within the cavity only a portion of the distance between the front tower surface and the inside rear surface.

25. A hydroponic tower comprising:
a cavity defined by a front tower surface and an inside rear surface opposite the front tower surface, wherein the front tower surface includes a cut-out; and
a plant plug holder inserted into the cut-out, the plant plug holder comprising:
an edge member, said edge member encircling a plant plug holder opening, said plant plug holder opening configured to receive a plant plug, wherein a back surface of said edge member is proximate to the front tower surface;
a base member extending rearward from said back surface of said edge member, said base member extending into the cavity such that a rearmost edge of said base member is substantially adjacent to the inside rear surface of the cavity wherein when a plant plug is fully inserted into the plant plug holder the plant plug contacts the inside rear surface of the cavity;
a rear shroud extending rearward from said back surface of said edge member, said rear shroud extending into said cavity, said rear shroud comprising:
a top member;
a first side member; and
a second side member;
wherein a first portion of said first side member extends rearward into said cavity to an equal extent as said top member, and wherein a first portion of said second side member extends rearward into said cavity to an equal extent as said top member; and wherein a second portion of said first side member extends rearward into said cavity to a greater extent than said top member, and wherein a second portion of said second side member extends rearward into said cavity to a greater extent than said top member.

26. The hydroponic tower of claim 25, wherein a rearmost edge of said second portion of said first side member is located within 2.54 millimeters of said inside rear surface of said cavity, and wherein a rearmost edge of said second portion of said second side member is located within 2.54 millimeters of said inside rear surface of said cavity.

27. A hydroponic tower comprising:
   a cavity defined by a front tower surface and an inside rear surface opposite the front tower surface, wherein the front tower surface includes a cut-out; and
   a plant plug holder inserted into the cut-out, the plant plug holder comprising:
      an edge member, said edge member encircling a plant plug holder opening, said plant plug holder opening configured to receive a plant plug, wherein a back surface of said edge member is proximate to the front tower surface;
      a base member extending rearward from said back surface of said edge member, said base member extending into the cavity such that a rearmost edge of said base member is substantially adjacent to the inside rear surface of the cavity wherein when a plant plug is fully inserted into the plant plug holder the plant plug contacts the inside rear surface of the cavity;
      a rear shroud extending rearward from said back surface of said edge member, said rear shroud extending into said cavity, said rear shroud comprising:
         a top member;
         a first side member; and
         a second side member;
   wherein the plug holder further comprises:
      a first open region located between said base member and said first side member, said first open region directly adjacent to a top surface of said base member, said first open region configured to promote water drainage from said top surface of said base member; and
      a second open region located between said base member and said second side member, said second open region directly adjacent to said top surface of said base member, said second open region configured to promote water drainage from said top surface of said base member.

28. The hydroponic tower of claim 27, wherein said first open region is configured as a first continuous open slot extending rearward from said back surface of said edge member, and wherein said second open region is configured as a second continuous open slot extending rearward from said back surface of said edge member.

29. The hydroponic tower of claim 1, A hydroponic tower comprising:
   a cavity defined by a front tower surface and an inside rear surface opposite the front tower surface, wherein the front tower surface includes a cut-out; and
   a plant plug holder inserted into the cut-out, the plant plug holder comprising:
      an edge member, said edge member encircling a plant plug holder opening, said plant plug holder opening configured to receive a plant plug, wherein a back surface of said edge member is proximate to the front tower surface;
      a base member extending rearward from said back surface of said edge member, said base member extending into the cavity such that a rearmost edge of said base member is substantially adjacent to the inside rear surface of the cavity wherein when a plant plug is fully inserted into the plant plug holder the plant plug contacts the inside rear surface of the cavity;
      a rear shroud extending rearward from said back surface of said edge member, said rear shroud extending into said cavity, said rear shroud comprising:
         a top member;
         a first side member; and
         a second side member;
   wherein the inside rear surface comprises a series of vertical ridges.

* * * * *